US012793130B1

(12) United States Patent
Rathore

(10) Patent No.: US 12,793,130 B1
(45) Date of Patent: Nov. 10, 2026

(54) SELF-CORRECTING DETECTION SYSTEM FOR OUT-OF-TOLERANCE REQUEST MESSAGES

(71) Applicant: Chicago Mercantile Exchange Inc., Chicago, IL (US)

(72) Inventor: Devendra Rathore, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/936,306

(22) Filed: Nov. 4, 2024

(51) Int. Cl.
*G06Q 30/00* (2023.01)
*G06Q 30/0202* (2023.01)
*G06Q 40/04* (2012.01)

(52) U.S. Cl.
CPC ......... *G06Q 40/04* (2013.01); *G06Q 30/0202* (2013.01)

(58) Field of Classification Search
CPC ...................................................... G06Q 40/04
USPC .......... 705/37, 1.1, 35, 36 R, 39, 26.1, 7.31; 700/91; 455/456.6
See application file for complete search history.

(56) References Cited

U.S. PATENT DOCUMENTS 11,017,057 B1 * 5/2021 Arazi ...................... G06F 17/18
2019/0005582 A1 * 1/2019 Kapur .................... G06Q 40/06

OTHER PUBLICATIONS ip.com NPL Search History.*
Julien Alexandre et al., "Accurate, real-time pricing for global credit and rates markets", Market Axess, 19 pages, Mar. 7, 2024, Whitepaper.
Julien Alexandre, "Algorithmic Pricing in the European Corporate Bond Market", Market Axess, 10 pages, Jan. 25, 2023, Whitepaper.
Tradeweb Markets LLC., "Tradeweb Launches A.I. Pricing Service for the U.S. Municipal Bond Market", 3 pages, Apr. 6, 2022.
Tradeweb; www.tradeweb.com/our-markets/data-analytics/securities-pricing/ai-price-for-municipal-bonds/; 2 pages.

* cited by examiner

*Primary Examiner* — John H. Holly
(74) *Attorney, Agent, or Firm* — Lempia Summerfield Katz LLC

(57) ABSTRACT

A processing system may generate value tolerance ranges for electronic data request messages received in an electronic trading system operating a market for a product. The value tolerance ranges may be generated via a self-correcting adaptive prediction routine based value engine. The adaptive prediction routine configured to produce a range indicator indicating whether an electronic data request message falls within the generated value tolerance range and a performance indicator indicating a confidence rating for accuracy for the value tolerance range. The performance indicator may be monitored to facilitate flagging of the adaptive prediction routine for training in a non-operative training mode when the performance indicator indicates accuracy below a determined tolerance.

20 Claims, 7 Drawing Sheets

SELF-CORRECTING DETECTION SYSTEM FOR OUT-OF-TOLERANCE REQUEST MESSAGES

BACKGROUND

With regard to trading of financial instruments, there may be two primary modes of trading used: bilateral and central counterparty. In bilateral trading, the parties to a trade effectively negotiate the parameters of that trade between themselves. In contrast, in a central counterparty based system, the parties submit their orders to trade to an intermediary which, in typical implementations, anonymously matches those orders with suitable counterorders submitted by other parties. For either bilateral or central counterparty, electronic trading systems are available to facilitate the electronic submission of orders to trade, e.g., buy or sell, instruments offered for trading by those systems, the matching of orders with suitable counter orders, clear trades, such as via third party clearing service, as well as provide access to information regarding available offers, completed trades and other "market" information. In addition, both bilateral and central-counterparty based electronic trading systems may provide risk management, clearing and settlement services to facilitate the completion of trades and the fulfillment of the obligations of the traders per the terms of their agreements.

As used herein, an order, order to trade or trade order refers to a willingness/desire of a trader to enter into a trade/transaction, and more particularly, to an electronic request or data message transmitted to, or received by, an electronic trading system which includes data indicative thereof, such as identity of a product, desired quantity, desired price, side (buy/sell), etc. As used herein, the term trade, executed trade, completed trade, etc., may refer to an agreement between two parties, each to fulfill an obligation defined by the transaction, and may further refer to a given order and the one or more suitable counter orders with which the given order has been matched and/or further cleared and/or settled. Orders may typically be canceled or modified by the submitting trader prior to them being matched with a suitable counter order. Once executed, the trader typically must fulfill their obligation unless they transfer, e.g., sell, or offset, such as by entering into an opposing trade, that obligation to another trader prior to the date on which fulfillment of their obligation is required.

A forward contract, such as a currency forward contract, referred to as an FX forward (forward Foreign eXchange contract), is an example of a contract which is traded via a bilateral trading system and calls for delivery of an asset at a later date for a price determined at the inception of the contract. In contrast, a spot contract, e.g., a spot FX contract, calls for substantially immediate, e.g., within 2 days, delivery. For currencies, an FX forward contract is a bilateral contract for delivery, actual or cash settled depending on the contract terms, of an amount of a particular currency, e.g., Euros, at a future date at a price, delineated in a different currency, e.g., dollars, determined at the inception of the contract. Unlike a futures contract, discussed below, a forward contract is traded "over the counter" (OTC), bilateral, e.g., negotiated directly between the parties as discussed above, and may or may not be standardized as to its terms. Option contracts on a forward contract are also available offering the buyer thereof the right, but not the obligation, to sell or buy the underlying forward contract at a specified price on or before a certain expiration date. Forward contracts may be physically settled, e.g., via the delivery of the amount of the particular currency called for in the contract, or cash settled via delivery of the cash difference, denominated in currency of the contract price, between the contract price and the spot price of the currency to be delivered, which may be the differential in exchange rates between when the contract was entered into and the delivery date. Options contracts for the delivery of a specific currency may also be offered bilaterally and call for delivery of the requisite currency, as opposed to a forward contract therefore. Options contracts traded via a bilateral/OTC trading system may be referred to as OTC options or OTC options contracts.

As will be described, FX spot, FX forward, as well as FX futures contracts, as described below, may relate to transactions for currency pairs. A currency pair comprises the national currencies from two countries coupled for trading on the FX marketplace. Both currencies will have exchange rates on which the trade will have its position basis. The calculation for the rates between foreign currency pairs is a factor of the base currency. A typical currency pair listing may appear as, EUR/USD 1.3045. In this example, the euro (EUR) is the base currency, and the U.S. dollar (USD) is the quote currency. The difference between the two currencies is a ratio price. In the example, one euro will trade for 1.3045 U.S. dollars. In other words, the base currency is multiplied to yield an equivalent value or purchasing power of the foreign currency. The phrase "quote currency", which may also be referred to as the "term currency," means, with respect to any currency pair, the second currency of such currency pair and is the currency that is being bought or sold to another party. The phrase "base currency" refers to the first currency in the Currency Pair against which the Client buys or sells the Quote Currency. The base currency typically refers to one, meaning one single currency against a number of quote currencies. This comparison answers the question of how many quote currencies equals in value one base currency. When one is long-biased, one always buys the base currency and sells the quoted. The opposite is also true.

In contrast to bilateral trading systems, central counter party-based trading utilizes an intermediary entity/system to separate the transacting parties such that, within the system, they are prevented from transacting/negotiating directly with one another, or, in most cases, even knowing the identify of their counterparty. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity or other underlier, such as a currency, at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity, instrument or asset to be delivered in fulfillment of the contract, or alternatively the commodity, instrument or asset for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, as opposed to typical bilateral contracts, e.g., forward contracts, the terms and conditions of each futures contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. At expiry, an option on futures, if in the money (ITM), described in more detail below, which expire into the underlying futures contract if not financially settled to cash, and if out of the money (OTM), it provides nothing. As will be discussed, an underlier of a futures contract may be a currency, e.g., the contract may be for delivery on a specified date of a quantity of Euros in exchange for a defined payment in U.S. dollars.

Aside from the above differences, bilateral and central-counterparty based trading systems differ in terms of who bears responsibility for counterparty risk, i.e., the risk of financial loss to one party to a trade due to the actions, inactions, or consequences thereof, such as the failure to perform on their obligations specified in the transaction, of the counterparty thereto.

In bilateral trading, each party, or intermediary agent, e.g., a prime broker or other access agent, via which that party trades, is, generally, directly responsible for the risk of loss in any given trade if their counterparty, or intermediary agent, e.g., a prime broker or other access agent, via which that counterparty trades, fails to perform. For example, in a cash/OTC market, prime brokers may create a central-counter party-like consolidation of counterparty risk to form a multi-tier structure where large participants, such as other prime brokers or very large banks, have bilateral risk. Bilateral electronic trading systems may support a three-tier structure where large, credit worthy entities, i.e., prime brokers, interact bilaterally and large to medium size trading entities access the market through those entities. Prime customers can also establish themselves as access agents, referred to as prime-of-prime brokers, servicing small and non-financial entities referred to as prime-of-prime customers. This model could be extended to any number of levels, but in practice three levels (bilateral, prime, and prime-of-prime) meet most business needs. As such, bilateral trading parties typically require credit verification or other guarantees, or risk mitigations, such as collateral, from their counterparties and often, as will be described, set limits on the amount of risk/exposure they are willing to undertake with a given counterparty. Such limits, which may be referred to as "hard limits," preempt transactions to prevent a limit overrun and may be applied whether or not an order trade is accepted and/or whether or not it is executed, and/or to filter or mediate the distribution of data related thereto. In contrast, a soft limit may be applied after trade execution and therefore, more loosely enforced.

Accordingly, bilateral electronic trading systems, as will be described, typically provide risk mitigations systems in the form of credit limit mechanisms, referred to as credit controls, which allow parties, for example, to define credit limits with respect to their potential counterparties which restrict the extent/magnitude of risk exposure and have the electronic trading system monitor, manage and enforce those limits on their behalf, as well as assist the parties in understanding and managing any credit limits to which they are subject. As any given party may enter into transactions with a myriad of counterparties, the number of different credit limits which a bilateral electronic trading system may have to maintain, manage and enforce may be substantial, as is the volume of transactions against which such limits must be assessed and accounted for.

In contrast, a central counterparty-based exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate counterparty credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments and assumes the counterparty risk to each. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

Accordingly, in central counterparty-based systems, generally, there may be no need for one party to be concerned about the credit worthiness of another party and so such credit verifications or counterparty credit limits may be avoided. However, the electronic trading system or central counterparty, itself, impose credit verifications and limits and other risk mitigations. For example, a central counterparty-based system may require traders to post a performance bond, or margin, in an amount set to cover the potential risk of loss of a trader's current positions. This performance bond may be adjusted on a periodic, e.g., daily, basis to account for the trading activities of the trader and the then current market value of their positions. In addition, where market participants transact in the trading system on behalf of other parties who may be financially responsible for the activities of those traders, the electronic trading system may permit the responsible party to specify limits, as will be discussed below, on the number or magnitude of open orders or completed trades, such as a margin limit.

While a central counter party-based trading system may offer certain advantages, such as anonymity and risk management, bilateral trading may still often be utilized in situations where the parties prefer not to use a central counterparty, e.g. due to cost, efficiency or other concerns, where the parties wish to complete a transaction as quickly as possible, and/or for non-standard transactions or unique transactions where the transaction terms are not standardized and/or the number of potential suitable and/or interested counter parties may be limited. For example, currency exchange transactions, such as transactions in non-deliverable currencies, foreign exchange forward or swap agreements, are typically entered into as bilateral transactions.

An example of a central counterparty-based electronic trading system is the Chicago Mercantile Exchange Inc. (CME) futures exchange, referred to herein also as an "Exchange", which provides a contract market where financial products/instruments, for example futures and options on futures, are electronically traded. An example of a bilateral electronic trading system is the EBS Direct Platform provided by CME Group, Inc., which is a wholesale electronic trading platform used to trade on the foreign exchange market (FX) with market-making banks.

The CME futures exchange may be referred to as an Order Driven Market (ODM) in which traders submit, with some limitations, arbitrary orders to buy or sell which are matched with previously received suitable counterorders, stored in an order book database, also referred to as a central limit order book (CLOB), or, otherwise, advertised to the market participants in order to attempt solicit a suitable counter order. In contrast, the EBS Direct Platform may be referred to as a Quote Drive Market (QDM), also referred to as a price driven market, which limits trading to binding quotes provided by designated participants, e.g., market makers or dealers, etc. Whereas an ODM may be more transparent, providing visibility, e.g., via an order book database, to all individual market orders to trade, a QDM provides liquidity by guaranteeing quoted prices. That is, in an ODM, a trader may place an order to buy or sell at a desired price but there is no guarantee that another trader will place a suitable counter order thereto to be matched by the ODM's electronic matching engines and traded. In a QDM, orders placed in the QDM's electronic quote matching systems against a submitted quote are essentially guaranteed to be fulfilled but quotes available at different prices may be limited. Other types of markets, including hybrid ODM-QDM markets, may also exist.

More particularly, a QDM may be considered a relationship-based model where there is limited anonymity—participants know their counterparty prior to transacting. Generally, in a QDM, participants play one or both of two discrete roles, liquidity providers (LP) and liquidity consumers (LC). These roles are fundamental, but can be blurred by some platform features. In an ODM, the participants are more equal where in the general case any participant can be a provider or a consumer. In a QDM, an LP prices their market data based on a priori evaluation and classification of consumers. In ODM, makers submit their orders that are priced without knowledge of the potential counterparty to a trade. Another difference is that in a QDM, LP's submit market data and consumers submit orders against that market data (the QDM platform often will aggregate and filter provider market data). Another way to consider these types of platforms it to consider business usage. For very liquid instruments that have efficient pricing (tight spread with reactive/volatile pricing). a central limit order book (CLOB) or ODM platform may provide the safest venue for exchanging risk due to efficient price discovery and collective wisdom of the market to set the price. When an instrument's price is very stable (not volatile) and/or market liquidity is thin (manifesting a wide bid/offer spread in a CLOB for example), a QDM platform may be preferred because the foreknowledge of one's counterparty allows quoting a tighter spread with greater safety and the consumer being able to know their provider allows certainty of fairness. When an instrument is very illiquid and/or specialized to the point that a provider can't safely provide a continuous price to a collection of similar consumers, then bespoke pricing method become helpful—these are referred to as request for quote or request for stream. Consumers ask for a price in an instrument and provider with knowledge of the consumer and current market conditions can elect to provide a price or stream of prices to the consumer. Knowledge of counterparty and full consideration of current conditions replace the wisdom of the market that would be present in a CLOB. RFQ/RFS is the oldest form of trading. "How much do you want for that? Or How much will you give me for this?" RFQ/S systems often support haggling or negotiated pricing features.

Current financial instrument trading systems allow traders to submit orders and receive confirmations, market data, and other information electronically via an electronic communications network at one or more execution venues, e.g., which implement/provide ODM and/or QDM type markets, each market having a queue for execution of received requests within that market. These execution venues may be geographically dispersed for the convenience of the traders or operator thereof and/or so as to be located geographically, i.e., in particular geographic regions, and/or logically, close to traders in order to, for example, minimize latency therebetween. An execution venue may refer to a physical and/or logical location at which data messages comprising orders to trade are considered to have been received by an electronic trading system and accorded priority against other such data messages subsequently received thereby which are competing for the same trading opportunity, i.e., where the trading system applies determinism to the received order, or where the orders to trade or received data messages are actually matched with a suitable counterparty forming a binding trade.

Computing systems, such as data transaction processing systems, often process data objects which are associated with values derived from or otherwise submitted or provided by external sources. Incoming messages related to the data objects may include requests for transactions which perform actions on the data objects at specified values. Whether or not the attempted actions are executed or performed depend in part on the values submitted with the incoming messages and/or the rules and processing routines programmed into a data transaction processing system.

One example of an environment including data objects having specified values is an electronic trading system wherein the values may be submitted by participants, e.g. traders. Electronic trading systems include objects having values associated therewith. Object values may change over time, and some changes to the value of an object may be undesirable or based on incomplete or inaccurate data. Some detection mechanisms, such as velocity logic detection systems, prevent undesirable changes in values over time (e.g., an undesirable "acceleration" due to high "impulse" events). Other detection mechanisms, such as stop logic detection systems, prevent undesirable gaps between reference and received or incoming values. However, these detection systems may focus on aggregate and/or movement effects of the market when or if a match occurs.

To mitigate risk and promote perception of a balanced market, electronic trading systems need to provide mechanisms to inform participants of situations where their individual actions may not comport with a consensus of the value of the traded products among the market participants while fully preserving the autonomy of participants to fully control and select their own trading strategy.

DETAILED DESCRIPTION

Figure 1:
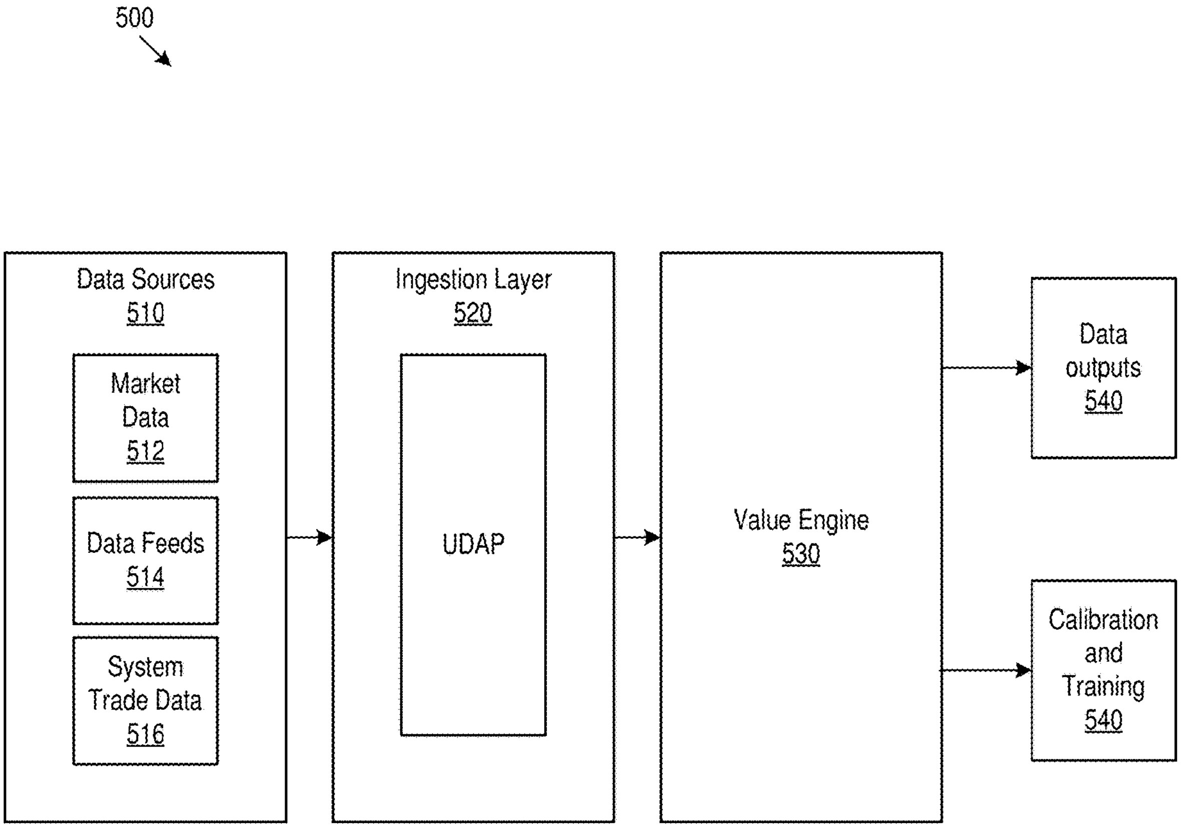
FIG. 1 shows an illustrative example adaptive prediction value tolerance range generation system.

The disclosed implementations relate generally to mechanisms for detecting and informing participants when particular request message fall outside of a tolerance range of likely eventual transaction match. The disclosed implementations herein do not suggest or require any particular trading strategy to participants, but rather inform participants when a particular prospective request is outside a range a likely match. In quote-driven-market (QDM) systems participants may lack broad spectrum information on the state of the QDM market for a particular product due to the bilateral and opaque nature of the QDM systems. Although transparency may be more readily available in order-driven-market (ODM) systems participants may still have difficulty determining whether apparently idiosyncratic actions by one or few participants reflect a better understanding of the true consensus by those one or few participants, or if the apparent idiosyncrasy is idiosyncratic. Such idiosyncratic behavior may be reflective of insights not understood or seen by others (idiosyncrasy is not bad), but it is important for participants to be able to quickly discern whether individually they missed details indicative of an in-process shift of consensus that to allow confident identification of idiosyncratic behavior.

Current financial instrument trading systems allow traders to submit orders and receive confirmations, market data, and other information electronically via a network. These "electronic" marketplaces have largely supplanted the pit based trading systems whereby the traders, or their representatives, all physically stand in a designated location, i.e. a trading pit, and trade with each other via oral and hand based communication. Electronic trading systems offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

The speed at which trades are executed through electronic trading systems provide many benefits. Electronic trading systems can facilitate a large number of market transactions. The greater the number of market transactions, the greater a market's liquidity. In liquid markets, prices are driven by competition, prices reflect a consensus of an investment's value, and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

This improved speed and efficiency also increases the speed at which changes may occur and propagate. Thus, in some cases, operations may begin to run ahead of various participants' understandings the true consensus of the value of traded products among the market participants, even in the context of fully-equitable access to market information. Moreover, in QDM systems information access is siloed with participants of each individual bilateral trade being the only ones aware of a full picture of that particular trade. Thus, in QDM contexts information is equitable but more closed than in ODM contexts.

In particular, traders, whether human or electronic, may act with less than full information and thus may unwittingly act in an idiosyncratic manner inconsistent with the true consensus, e.g., a "consensus-inconsistent" manner. The result may be unwittingly becoming a "first mover" when intending to follow trends and/or following unstable or emergent trends when intending to pursue a more median strategy.

Therefore, there is demand for a tool that provides information regarding a more wholistic information to participants about current pricing for products, such as those in ODM and/or QDM markets for treasuries, other cash markets, energy futures, and/or virtually any other futures market.

The disclosed implementations evaluate values associated with messages for certain markets, instruments, products or contracts, which may be implemented as, or represented by, objects, i.e. data objects, in the exchange computing system. For example, the values that are evaluated may be associated with newly received or incoming messages, or with messages previously received by the system, such as messages comprising requests for transactions related to an object. In one implementation, an administrator associated with an exchange computing system may determine which messages and values associated therewith fall within and value tolerance range. Within the range request messages are likely to be matched (or at least matched in part) whereas outside the range messages are less likely to be matched. The disclosed implementations may determine the range such that at least first target portion of the request volume of messages within the range match (or are predicted to match) while at least a second target portion of messages outside the range do not match (or are predicted not to match). As will be discussed below, evaluation of the performance of the generated value range may be based on prediction-based evaluation metrics and/or historical review evaluation metrics.

In various implementations disclosed herein, the generation of the value tolerance range may be based on an adaptive prediction routine. FIG. 1 shows an illustrative example adaptive prediction value tolerance range generation system (APVTS) 500. In the illustrative example APVTS, the data to support training of a machine-learned routine may be taken from a broad spectrum of sources 510 including market data sources 512, such as data feeds 514 and/or internal system trade data 516 for markets for the product being analyzed and related products, news or government data feeds (such a climate data for crop-based/crop-affected commodities, and/or other information sources. A data ingestion layer 520, such as a Unified Data Analytics Platform (UDAP) compliant ingestion layer, may receive, clean, and unify (by format) the data from the sources 510.

For example, the data ingestion layer 520 may place the data from the disparate sources into one or more predefined formats usable by the adaptive value engine 530.

The data ingestion layer 520 may clean the data by removing and/or otherwise masking private data, e.g., from internal system trade data such as the identities of participants in a bilateral trade. As an illustration, the data ingestion layer 520 may retain information from a bilateral trade that may affect price of the product involved in the trade (or other related products), but may anonymize the parties involved.

Data cleaning may also include data curation, e.g. for supervised learning modes of the value engine 530. Data curation may include selective (e.g., algorithmic and/or operator directed) removal of outlier data, selective addition/removal of historical value result data (e.g., to shape the historical data more in line with recent market behavior trends), and/or other data curation. The curation may be applied to both or either of training input data (e.g., data source input data/synthesized input data) and training result data (synthesized and/or historical value (e.g., pricing) data). Thus, training may be controlled via both data inputs and data outputs 540 by the adaptive prediction routine underlying the value engine 530.

In the illustrative example APVTS 500, the value engine 530 may operate in two modes including a calibration & training mode (e.g., which may be supported via supervised learning) and a prediction/model output mode in which the value engine provides value tolerance ranges for participants making trades using the product(s) covered by the APVTS 500.

The value engine 530 may use price/value discovery, transaction cost, and algorithmic strategies. In various implementations, the illustrative example APVTS 500 may implement machine-learning models such as linear regression models, tree-based learning algorithms, and/or gradient boosting methods. The calibration & training mode may be supported by linear mixed models (LMM). The calibrated/trained outputs may be used to provide value tolerance ranges for participants.

The illustrative example APVTS 500 may be applied in various markets. As an illustration, the APVTS 500 may be applied across markets for equivalent/same-issuer bonds, across various market spread conditions, in various dealer-run markets and/or other markets, across comparable bond markets (e.g., with like issuers, like maturity, like sector, and/or like rating), across various bond issuer markets (US Treasuries, European Government Bonds, Japanese Government Bonds, and/or other sovereign bonds), and denominated in various currencies (US dollar, Euro, Pounds, Australian dollar, Swiss franc, Japanese yen, Norwegian krone, Brazilian real, and/or other currencies). In various implementations, value tolerances may be generated in a first currency and reported in a second via the APVTS 500 using an exchange rate conversion.

The APVTS 500 may use multiple inputs including time, side (polarity), trade size (e.g., request volume) and/or other individual trade characteristics for each individual trade. Additionally or alternatively, for an interval (which may include the analysis of one or more trades), the APVTS 500 may use one or more adaptive routine inputs, such as machine learning models, artificial intelligence models, training inputs or other adaptive routine inputs. Additionally or alternatively, such intervals may include data source inputs from the data sources 510. The rate of refresh for data source inputs may differ from the rate of refresh for adaptive routine inputs. Additionally or alternatively, rate of refresh for data sources may be per source, e.g., refresh may occur at different rates for different data sources. As an illustration, market data sources may update in real time with most recent market data. Other data sources may have periodic refresh, e.g., every minute, every five minutes, every hour, daily, or other interval. In some cases, updates may be held and low precision model executions may be performed using the held data updates. When a threshold price tolerance difference is detected, the held data may be integrated with the existing data and a full run of the adaptive routine may be executed. This improves the efficiency of the computer system by only performing hardware-processor-taxing full runs of the adaptive routine to refresh a high precision tolerance when sufficient change to conditions have occurred such that running the adaptive routine results in a tolerance level change (which is an improvement to the technology of the system and causes the system to operate differently than it otherwise could).

The data sources 510 may include various data sources for information related to pricing/value. As an illustrative example, the BrokerTec® platform may provide data interfaces including graphical user interfaces (GUIs) and application programming interfaces (APIs) which may provide data for trading of various financial instruments, including US Treasuries, repofund futures, sovereign bonds, and/or other financial instruments. As one example of a BrokerTec® platform tool, the BrokerTec® Stream may provide a relationship-based environment that may use relatively smaller pricing increments than other trading environments, e.g., which as a data source may provide increased resolution for pricing information. In some cases, significant liquidity, for example, via US Treasury based securities, may flow through the BrokerTec® platform. Thus, in an anonymized privacy-preserving aggregate, the data flowing through a system, like the BrokerTec® platform, may provide a comprehensive data source able to capture the various dynamics spanning multiple related markets.

In some cases, data from such platform may be used to support the value engine 530 discovery operations. Value data from such platforms may be used to drive pricing determinations. Thus, value information from one platform (or many platforms) may be used to guide value determination across platforms, e.g., the value engine 530 may be able to generate more accurate value data than would be possible using data only from a particular platform where a particular instance of the value engine 530 is being used.

In some cases, updates based on one or more data sources may be synchronized (or timed to an individual source threshold). For example, the APVTS 500 may cache input data from one or more input data sources (e.g., news feeds, market data feeds, and/or other sources) and run an update of the value tolerance range when each of the one or more input data sources accumulated more than a defined threshold volume of updates. The defined thresholds may be specific to each source and/or shared among multiple sources. In some cases, a single threshold may be met by the combined volume (e.g., a combined weighted volume) of multiple different sources.

The APVTS 500, via the value engine 530, may output indications, which may be real-time responses to trade request messages, of whether a particular trade is within the value tolerance range most recently determined by the APVTS 500. When a trade request message is within the value tolerance range the trade request message may be more likely to be matched (e.g., by a match detector) than when outside the range. In some cases, the ranges may indicate defined minimum likelihoods of matching for in-range requests and defined maximum likelihoods of matching for out-of-range requests.

Computed ranges may be extrapolated across multiple different products. For example, a range for a comparatively liquid product market may be extrapolated to a comparatively less liquid product market, e.g., because the frequency of data updates from less liquid markets may be less than that of the more liquid markets. Thus, data from more liquid markets may be less stale and may help to provide a fuller real-time picture of the current state of a comparatively less liquid market (e.g., when combined with data from the less liquid market to perform the extrapolation).

The value tolerance ranges may provide insight into the depth and spread of a market for participants receiving input from the APVTS 500, the participants may be able to better leverage the depth of the market data.

In various implementations, the value tolerance range may be communicated to participants in various forms. For example, a participant may place a request (e.g., a trade) at an application interface (such as an interactive trading dashboard). The request may be sent over an electronic network to an electronic trading system hosting the APVTS 500, the AVPTS 500 may evaluate whether the request falls within the computed value tolerance range. The AVPTS 500 may generate an indicator whether the request fall within the range. The indicator may be displayed on the application interface.

Additionally or alternatively, the value tolerance range may be displayed on the application interface for the participant (e.g., not necessarily in response to a request provided by the participant). In some cases, the application interface may be specifically designed to ensure that the participant is alerted to the range before placing a request. For example, the range may be displayed an overlaid over an input field for the request within the application interface. Thus the participant may be required to clear the overlay before proceeding to input a request. In some interfaces that use, user experience may be degraded via click-through solutions where the user must click through an overlay (such as a tool-tip type overlay) before proceeding. Accordingly such overlay technologies may be improved in their fundamental functioning as a graphical interface component by reducing such experience degradation. A click-less mouse-over clearing of the overlay may reduce such experience degradation by clearing the overlay (while still performing the information delivery) without inhibiting the request entry task through the interface.

In some cases, such overlays may be used when a participant has entered (but not yet submitted) an out-of-tolerance request. An overlay or other conditional prompt may be generated in response to the entry of the out-of-tolerance request to request additional input from the participant such as an additional confirmation that submission of the out-of-tolerance request was not an erroneous input.

In various implementations, the value tolerance range may be used for automatic filtering/mitigation of erroneous/anomalous requests by a participant. For example, a participant may freely develop a trading strategy that may include some historical portion of out-of-tolerance requests, e.g., none, less than 1% of requests, less than 5% of requests, less than 10% of requests, less than 50% of requests, and/or other portion of requests. In the example, the participant may generate one or more requests that cause a deviation from the historical behavior of the participant, the APVTS 500 may flag the one or more requests for a response action. The response action may be automatic cancelation before placement (or since the out-of-tolerance requests are unlikely to match in the immediate future cancellation of at least some of the one or more requests after placement, e.g., immediately upon identification of the anomalous pattern). The response action may include generating an alert for the participant indicating a start time for the anomalous pattern and an indication of the identified requests. In some cases, participants may rely on algorithmic trading systems that may respond anomalously to various conditions creating behavior by the algorithmic trading system that is unexpected and undesirable to participant. Further because algorithmic trading systems operation well-below human perceptible time scales, significant shifts to behavior of the algorithmic trading system may occur before a human is able to identify and respond to the behavior of the algorithmic trading system. Thus, there is demand for technical solutions that can identify and respond to such anomalous operation at below-human-perception time scales. The response flagging of the APVTS 500 provides such a technical solution by identifying out-of-tolerance requests using the value engine 530 and responding to requests falling out of the value tolerance range.

The APVTS 500 may be further configured to accept as an input a threshold number/portion of out-of-tolerance requests that the APVTS 500 should allow for the participant before taking a response action. For example, the participant may indicate a portion, e.g., none, less than 1% of requests, less than 5% of requests, less than 10% of requests, less than 50% of requests, and/or other portion of requests. Then, when the portion, as expressly determined and directed by the participant, is exceeded the AVPTS 500 may execute the response action. The technological solutions to accept such a parameter based on out-of-tolerance requests (not used by conventional systems) and execute a response action based on out-of-tolerance requests (not done by conventional systems) provides an improvement to technology through anomalous message detection, filtering, and response in a non-conventional way. Moreover, by processing a parameter not accepted by conventional systems and responding in a manner not done by conventional systems, the APVTS 500 operates differently than it otherwise could, e.g., without these technical features.

In various implementations, computation of value tolerance ranges using adaptive prediction routines may implement self-correcting training execution. Specifically, the adaptive prediction routine may self-initiate supervised learning to implement self-correction of its own performance, self-correcting adaptive prediction value tolerance range generation details more than a "result" (e.g., the described embodiments detail more than stating that a value tolerance range is generated) because the self-correcting adaptive prediction value tolerance range generation system is an integrated practical implementation detailing the specific acts of executing training of the adaptive prediction routine in a supervised learning mode, exiting the supervised learning mode into an unsupervised operation mode, initiating self-correction by asserting a return flag for return to the supervised learning mode, and exiting the unsupervised operation mode in response. The specific selection and ordering of these operations causes the system to operate specifically and differently than it otherwise could, e.g., if value tolerance range generation were merely "applied" on a generic computer-based system.

To implement the self-correcting computation of value tolerance ranges using adaptive prediction routines, technical arrangements may be selected. Technical arrangements for an implementation may affect various technical implementation characteristics. For example, a technical arrangement may affect how, when, and what memory locations are accessed, which operations are performed on the data stored in those memory locations, the fundamental operational behavior of the system, the timing for the operations, and which order such operations are performed. For example, the example technical arrangements for the self-correcting computation of value tolerance ranges using adaptive prediction routines discussed below differ in that one relies on a model accuracy self-diagnostic to dynamically initiate supervised training; the other relies on periodic timing for self-correction initiation. Technical arrangements may affect operation efficiency, calculation accuracy, computational load, memory usage, and various other technical characteristics. Thus, technical arrangements further improve the operation of the underlying hardware.

Further, a specific technical arrangement details more than the already concrete and technical algorithmic acts of executing training of the adaptive prediction routine in a supervised learning mode, exiting the supervised learning mode into an unsupervised operation mode, initiating self-correction by asserting a return flag for return to the supervised learning mode, and exiting the unsupervised operation mode in response. Selection among these example technical arrangements and others, is exclusively based on the technical considerations (e.g., processing power, system latency, processing throughput, processing load timing and/or distribution, etc.) in addition to the separate technical question as to whether self-correcting computation of value tolerance ranges using adaptive prediction routines should be deployed within the system. Self-correcting computation of value tolerance ranges using adaptive prediction routines may be deployed in a system independently of any particular technical arrangement, e.g., by implementing self-correcting computation of value tolerance ranges using adaptive prediction routines using another different technical arrangement that lacks the features of that particular technical arrangement. Thus, each technical arrangement and each combination of multiple technical arrangements causes a computer-based system to operate differently than it otherwise could, e.g., if another technical arrangement (or different combination thereof) were implemented.

For the purposes of illustration, two example technical arrangements are discussed below.

Accuracy-Diagnosis Triggered (ADT) Arrangement—As an example of a technical arrangement for implementation of self-correcting computation of value tolerance ranges using adaptive prediction routines, the system may monitor, (e.g., based on historical match data and/or predicted match data) a first portion of the volume of matches in the determined value tolerance range that matched and/or are predicted to match and/or a second portion of the volume of matches outside of the value tolerance range that matched and/or are predicted to match. When the system determines that the first portion falls below a first accuracy threshold and/or the second portion goes above a second accuracy threshold, the system may determine that self-correction should be initiated. The system may assert a flag that causes the system to re-enter a training mode (e.g., supervised-learning mode and/or other non-operative training mode designated for self-correction of the system). In various implementations, the system may initiate self-correction during a next window of opportunity, such as during a scheduled window (e.g., overnight; after market close; in a defined interval occurring hourly, daily, weekly; and/or other scheduled window), after an alerted operator acknowledges the flag, when sufficient data to support re-training accumulates from sources, immediately upon assertion, on a mirrored instance of the system running in parallel, and/or under other defined conditions for execution in response to the asserted flag. The ADT arrangement may ensure that non-operative training mode operation occurs when the system's operation has accuracy levels warranting such an interruption to output-generating operation. Accordingly, the ADT arrangements tend to have increased system up time relative to other arrangements, such as the scheduled arrangement discussed below, in periods of static conditions. Where conditions are more rapidly changing, ADT arrangements may initiate relatively more self-correction. However, the accuracy of the ADT arrangement based systems is relatively more consistently maintained compared to scheduled arrangement based systems because the scheduled arrangement does not dynamically adapt the timing of self-correction to changing conditions.

The ADT arrangement does have a processing efficiency cost because the ADT arrangement includes the processing load of accuracy monitoring. Accuracy monitoring may require forward analysis of predicted matches and/or backward analysis of historical matches. Accordingly, the technical benefits of increased accuracy consistency and dynamically reduced processing loads during static conditions may be weighed against operating the system differently, e.g., in a scheduled arrangement (or other technical arrangement for self-correcting computation of value tolerance ranges using adaptive prediction routines).

Scheduled Arrangement—As another example of a technical arrangement for implementation of self-correcting computation of value tolerance ranges using adaptive prediction routines, the system monitor a time parameter and assert a flag to initiate self-correction when a predetermined time for scheduled correction is reached. In the scheduled arrangement, rather than monitoring current conditions, either of the performance of the system itself or (as in other arrangements) based on activity threshold monitoring, e.g., based on activity volumes indicated via input data sources, such as market data feeds, the system asserts flags for self-correction based on a time variable. Therefore, monitoring for scheduled arrangement may be associated with comparatively light hardware processor loads because the assertion occurs based on elapsed time.

Various technical arrangement are possible, including arrangements that blend at least some features from the illustrative ADT arrangement and/or the scheduled arrangement discussed above. For example, the ADT arrangement may be modified such that a maximum time period between self-correction sessions is enforced, e.g., the system will assert the flag for self-correction regardless on the accuracy monitoring condition if more than a threshold interval from a last self-correction has elapsed.

While the disclosed implementations will be described with respect to a product by product or market by market implementation, e.g. implemented for each market/order book, it will be appreciated that the disclosed implementations may be implemented so as to apply across markets for multiple products traded on one or more electronic trading systems, such as by monitoring an aggregate, correlated or other derivation of the relevant indicative parameters as described herein.

While the disclosed implementations may be discussed in relation to futures and/or options on futures trading, it should be appreciated that the disclosed implementations may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed implementations may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. As was discussed above, electronic trading systems offer an efficient, fair and balanced market where market prices reflect a true consensus of the value of products traded among the market participants, where participants have equitable input and access. The techniques and architectures discussed herein are consistent with implementation of this efficient, fair and balanced market and provide operators of hardware-based electronic trading systems with improved operational flexibility and efficiency, relative to conventional systems, as they continue to meet these demands. Further, as future electronic trading system improve in speed and computational throughput beyond current capabilities, the techniques and architectures discussed herein will aide in continuing efficient, fair and balanced market operation.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day in the morning, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the morning settlement, a daily intra-day mark-to-the market of all open positions, including trades executed during the overnight GLOBEX®, the CME's electronic trading systems, trading session and the current day's trades matched before late morning, is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

The disclosed implementations recognize that electronic messages such as incoming messages from market participants, e.g., trade order messages, etc., are sent from market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

In one implementation, the disclosed system may include a messaging management module that is the point of ingress/entry and/or egress/departure for all transactions, i.e., the network traffic/packets containing the data therefore, specific to a single market at which the order of receipt of those transactions may be ascribed. A messaging management module may be utilized for the purpose of deterministic operation of the market. The electronic trading system may include multiple messaging management modules, one for each market/product implemented thereby. For more detail on deterministic operation in a trading system, see U.S. patent application Ser. No. 14/074,667 entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE" and filed on Nov. 7, 2013, the entire disclosure of which is incorporated by reference herein and relied upon.

For example, a participant may send a request for a new transaction, e.g., a request for a new order, to a messaging management module. The messaging management module extracts or decodes the request message and determines the characteristics of the request message.

The messaging management module may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

In one implementation, if a participant wishes to modify a previously sent request, e.g., a prior order which has not yet been processed or traded, they may send a request message comprising a request to modify the prior request.

In one exemplary implementation, the incoming request itself, e.g., the inbound order entry, may be referred to as an iLink message. iLink is a bidirectional communications/message protocol/message format implemented by the Chicago Mercantile Exchange Inc.

While the disclosed implementations may be described in reference to the CME, it should be appreciated that these implementations are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed implementations are also not limited to uses by a clearing house or exchange for purposes of enforcing a performance bond or margin requirement. For example, a market participant may use the disclosed implementations in a simulation or other analysis of a portfolio. In such cases, the settlement price may be useful as an indication of a value at risk and/or cash flow obligation rather than a performance bond. The disclosed implementations may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining", the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed implementations may be incorporated into margin requirement(s) determined by the risk management method or system.

In one implementation, the disclosed methods and systems are integrated or otherwise combined with one or more of the risk management systems implemented by CME. These systems may include the Standard Portfolio Analysis of Risk™ (SPAN®) system, the SPAN 2® system, as well as improvements/enhancements thereto, or other risk management systems now available or later developed. Generally, the SPAN® and SPAN 2® systems base performance bond requirements on the overall risk of the portfolios using parameters as determined by CME's Board of Directors, and thus represents a significant improvement over other performance bond systems, most notably those that are "strategy-based" or "delta-based." Further details regarding SPAN® are set forth in the above-referenced patent. Like SPAN, the SPAN 2® framework may be based on a Value at Risk (HVaR) framework, using historical data to model how a position or portfolio may gain or lose value under various risk scenarios. The SPAN 2® framework may allow implementation of granular and dynamic adjustments to margins at a product and portfolio level. In addition, enhanced reporting of margining into different risk factors such as market risk, liquidity, and concentration may be provided.

The implementations may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed implementations, e.g., the market participants, may be referred to by other nomenclature reflecting the role that the particular entity is performing with respect to the disclosed implementations and that a given entity may perform more than one role depending upon the implementation and the nature of the particular transaction being undertaken, as well as the entity's contractual and/or legal relationship with another market participant and/or the exchange.

Figure 2A:
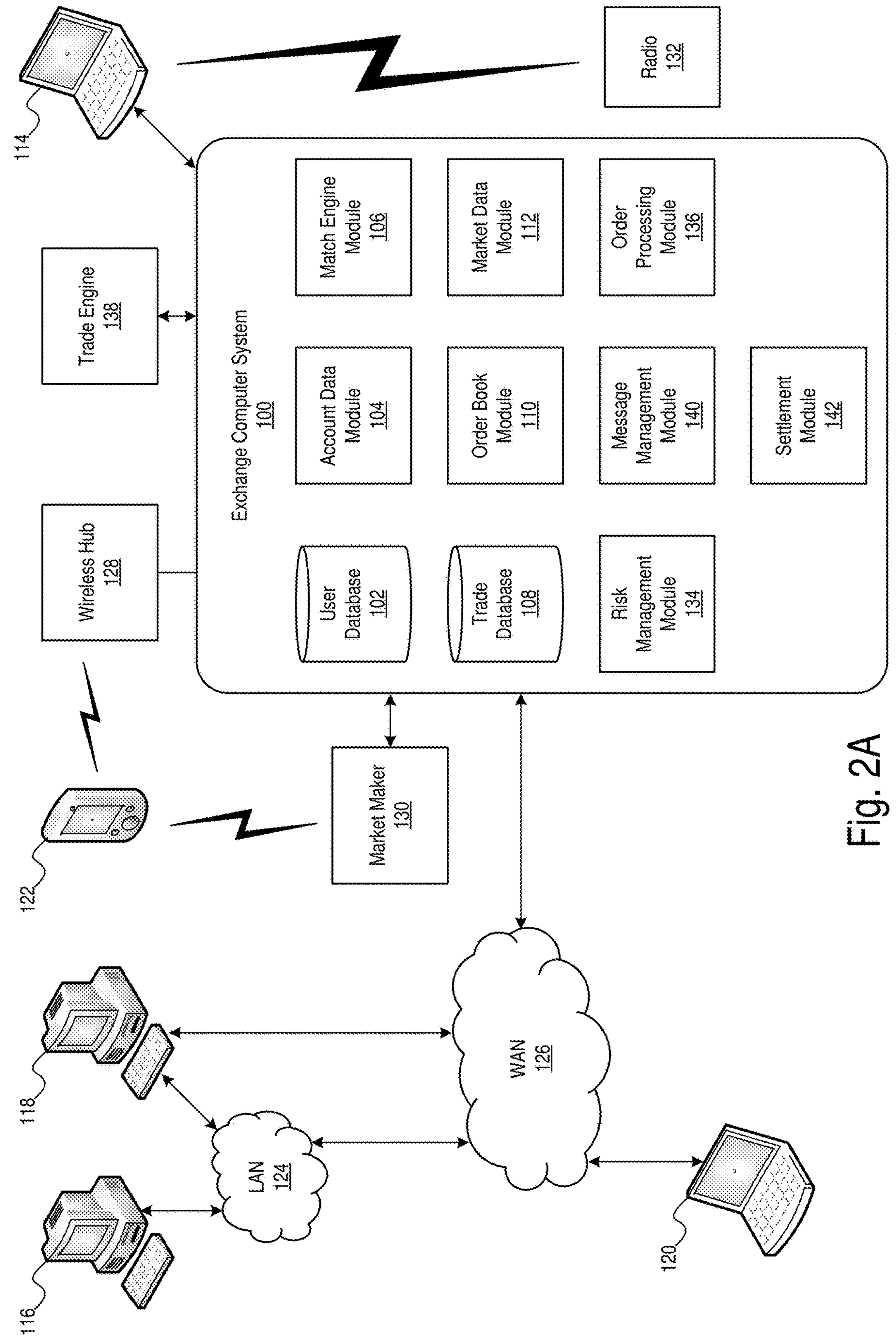
FIG. 2A depicts an illustrative computer network system that may be used to implement various features of the disclosed implementations.

An exemplary trading network environment for implementing trading systems and methods is shown in FIG. 2A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some implementations, the risk management module 134 implements one or more aspects of the disclosed implementations, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed implementations.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some implementations, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some implementations, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In an implementation, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 2B:
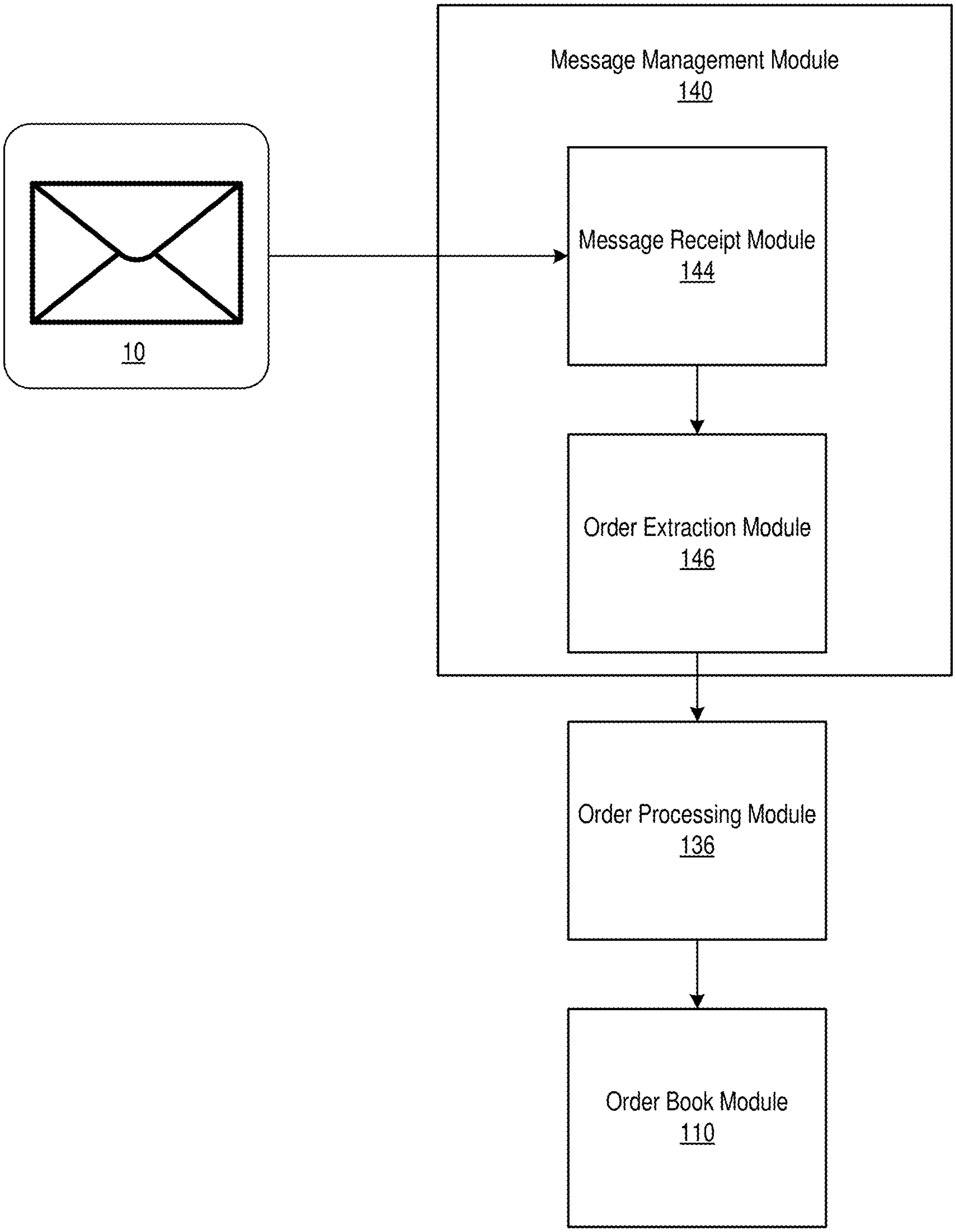
FIG. 2B depicts an example market order message management system for implementing various features of the disclosed implementations.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 2B provides additional details for the message management module 140.

As will be described, the disclosed impulse detection and mitigation system may be implemented as part of the risk management module 134 and/or match engine module 106. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed implementations may be implemented as a different or separate module of the exchange computer system 100, or a separate computer system coupled with the exchange computer system 100 so as to have access to margin account record, pricing, and/or other data. As described above, the disclosed implementations may be implemented as a centrally accessible system or as a distributed system, e.g., where some of the disclosed functions are performed by the computer systems of the market participants.

The trading network environment shown in FIG. 2A includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 3, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 3 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 2A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 2A also shows the LAN 124 coupled with a wide area network ("WAN") 126 which may be comprised of one or more public or private wired or wireless networks. In one implementation, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 3 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 2A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 2A is merely an example and that the components shown in FIG. 2A may include other components not shown and be connected by numerous alternative topologies.

As shown in FIG. 2A, the exchange computer system 100 further includes a message management module 140 which may implement, in conjunction with the market data module 112, the disclosed mechanisms for managing electronic messages containing financial data sent between an exchange and a plurality of market participants, or vice versa.

FIG. 2B illustrates an implementation of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an implementation, the order processing module may execute an associated action of placing the order into an order book for an electronic trading system managed by the order book module 110. In an implementation, placing an order into an order book and/or into an electronic trading system may be considered a primary action for an order. The order processing module 136 may be configured in various arrangements, and may be configured as part of the order book module 110, part of the message management module 140, or as an independent functioning module.

The implementations described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one implementation, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

Figure 3:
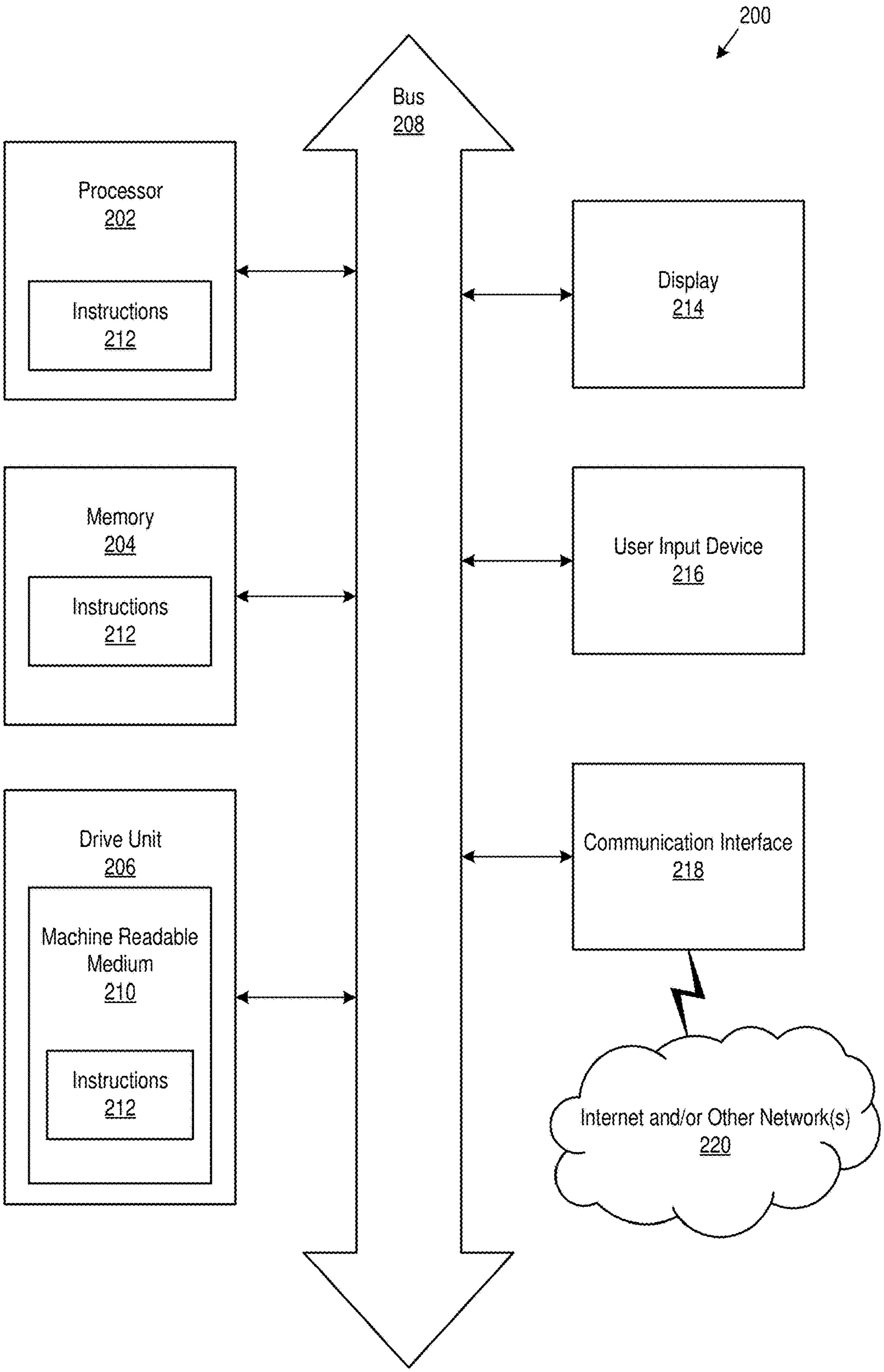
FIG. 3 depicts an illustrative implementation of an example computer system for use with the disclosed implementations.

Referring to FIG. 3, an illustrative implementation of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed implementations are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 3, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular implementation, as depicted in FIG. 3, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular implementation, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary implementation, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated or otherwise specifically configured hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a graphics processing unit (GPU), a neural processing unit (NPU), an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed implementations may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The disclosed embodiments are drawn to systems and methods that include specific computing components, each being specially programmed to perform a technological function as part of a greater technological process. The disclosed embodiments include separate system components interconnected in a specific way to implement aspects of the disclosed system and include sufficient specific structure and function and, as such, are not drawn to an abstract idea. The use of software in the disclosed embodiments further makes non-abstract improvements to the computer technology just as hardware improvements can, and the improvements may be accomplished through either route.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

In an implementation, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an implementation, the market may operate using characteristics that involve collecting orders over a period of time, such as a batch auction market. In such an implementation, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an implementation, the other data may be data indicating a particular time in which the action is to be executed. As such, the order may be considered a temporally specific order. The particular time in which an action is undertaken may be established with respect to any measure of absolute or relative time. In an implementation, the time in which an action is undertaken may be established with reference to the beginning time of the time period or ending time of the time period in a batch auction implementation. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an implementation, the electronic message may also include other actions to be taken with respect to the order. These other actions may be actions to be executed after the initial or primary action associated with the order. For example, the actions may involve modifying or canceling an already placed order. Further, in an implementation, the other data may indicate order modification characteristics. For example, the other data may include a price or volume change in an order. The other actions may involve modifying the already placed order to align with the order modification characteristics, such as changing the price or volume of the already placed order.

In an implementation, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an implementation, the action, or a primary action, associated with an order may be executed. For example, an order extracted from electronic message order characteristics may be placed into a market, or an electronic order book for a market, such that the order may be matched with other order counter thereto.

In an implementation involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an implementation, the action may be executed at the particular time. For example, in an implementation involving a batch auction process having sub-periods during an order accumulation period, an order may be placed during a specified sub-period of the order accumulation period. The disclosed implementations may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an implementation, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an implementation, the execution of temporally specific messages may be controlled by the electronic trading system such that a limited or maximum number may be executed in any particular accumulation period, or sub-period. In an implementation, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an implementation, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an implementation involving a market operating on batch auction principles, the event may be detected subsequent to the execution of a first action, placing an order, but prior to the ending time of an order accumulation period in which the action was executed.

In an implementation, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an implementation, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an implementation, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an implementation, the financial product may be based on an associated financial instrument which the electronic market is established to trade.

In an implementation, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an implementation, data relating to the received transaction is stored. The data may be stored in any device, or using any technique, operable to store and provide recovery of data. For example, a memory 204 or computer readable medium 210, may be used to store data, as is described above with respect to FIG. 3. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be saved. The data may be stored in any device, or using any technique, operable to store and provide recovery of data. For example, a memory 204 or computer readable medium 210, may be used to store data, as is described above with respect to FIG. 3. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as a Market Quality Index (MQI) as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, an MQI of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders. Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed implementations recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary implementations, all transactions for a particular market may be ultimately received at the electronic trading system via one or more points of entry, e.g., one or more communications interfaces, at which the disclosed implementations apply determinism, which as described may be at the point where matching occurs, e.g., at each match engine (where there may be multiple match engines, each for a given product/market) or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one implementation, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Stop orders also rest on, or are maintained in, an order book to monitor for a trade at the stop price, which triggers an attempted trade at the limit price. In one implementation, a triggered limit price for a stop order may be treated as an incoming order in some of the methods described herein.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.

2. Sort the list by order size, largest order size first. If equal order sizes, oldest timestamp first. This is the matching list.

3. Find the 'Matching order size, which is the total size of all the orders in the matching list.

4. Find the 'tradable volume', which is the smallest of the matching volume and the volume left to trade on the incoming order.

5. Allocate volume to each order in the matching list in turn, starting at the beginning of the list. If all the tradable volume gets used up, orders near the end of the list may not get allocation.

6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.

2. Sort the list by explicit time priority, oldest timestamp first. This is the matching list.

3. Find the 'Matching volume', which is the total volume of all the orders in the matching list.

4. Find the 'tradable volume', which is the smallest of the matching volume and the volume left to trade on the incoming order.

5. Allocate volume to each order in the matching list in turn, starting at the beginning of the list.

6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume 4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed implementations, and all such algorithms are contemplated herein. In one implementation, the disclosed implementations may be used in any combination or sequence with the allocation algorithms described herein.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed implementations may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly}=\text{Leg1}-2\times\text{Leg2}+\text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. Implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed implementations may be implemented in a data transaction processing system that processes data items or objects. Customer or user devices (e.g., computers) may submit electronic data transaction request messages to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers.

The disclosed implementations may be implemented to automatically perform a corrective action, e.g., halt or release the matching processor depending on the state of the system and/or the contents of the electronic data transaction request messages. For example, upon detecting an undesirable condition within the data transaction processing system, the disclosed impulse detection and mitigation system may cause halting of the matching processor, which prevents the matching processor from matching messages, e.g., places the system or data objects related to the undesirable condition in a reserved state. After the passage of time, receipt of a number of messages, or some other predetermined condition, the impulse detection and mitigation system may release the matching processor, or allow the matching processor to resume matching messages.

The disclosed implementations effectively periodically sample, derive or otherwise measure a parameter indicative of the market value of a product (e.g., a state value), such as a futures contract, which may be represented as a data object within a data transaction processing system. The market for the product may also be referred to as an order book, which may be stored as a data structure within the memory of the data transaction processing system. Parameters indicative of the market value include the most recent price at which a trade was matched or quantity associated therewith, the most recently received, i.e. via an incoming order, bid price or quantity associated therewith, the most recently received, i.e. via an incoming order, ask price or quantity associated therewith, the current lowest ask price for an unmatched trade order resting in the order book or quantity associated therewith, the current highest bid price for an unmatched trade order resting in the order book or quantity associated therewith, combinations thereof or derivations therefrom, such as volatility, average, difference from historical values or other parameter, statistical or otherwise, indicative of the conditions under which the market is operating. When monitoring price based parameters, the values associated therewith may be measured in ticks, points or other quantized metric. In some implementations, non-quantized continuous values may be used such as fractional values of quantized metrics. Time may be measured, as an overall elapse of time from an origin and/or between defined events, in second or milliseconds, or other increment. When sampling, deriving or otherwise measuring a parameter that is derived from an incoming trade order, such as the order price, every trade may be sampled or otherwise analyzed for comparison as will be described.

The disclosed implementations may also monitor certain messages or orders for products traded via the exchange computing system. The disclosed implementations may also monitor certain messages or orders for order books maintained on the exchange computing system. The products or order books may be represented as data objects within the exchange computing system. The monitored messages may be recently received messages (e.g., a limit price on a new incoming order, or a modification of a previous order), or recently triggered messages (e.g., a limit price in a stop order resting on the books that is triggered by a trade at the stop price).

The impulse detection and mitigation system may first determine whether or not an incoming message will actually trade, or cause a match, e.g., with a resting order. For example, a message management module 140, an order extraction module 146, and/or order processing module 136 of an exchange computing system may collectively extract and analyze a message and execute an instruction or action included therewith, including determining whether the message will cause or be involved in a match event. If it is determined that the message will cause or be involved in a match event, the impulse detection and mitigation system may also determine what portion of the requested quantity trades (e.g., whether all of the requested quantity of the order is satisfied/matches) or partially trades (e.g., whether only some of the quantity is satisfied/matches and the remaining quantity rests on the book to await a subsequent suitable counter order), and will also determine the trade prices (as opposed to the limit or submitted price) at which quantities will match or trade, e.g., match values. It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order. The matched portion (whether full or partial) may include the portion that contributes to the change in throughput, e.g., the mass threshold of the impulse criterion and/or impulse boundary.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

The values to be tested (whether they be the current sampled, derived or measured parameters or value at which different quantities will actually trade, depending on whether the order matches at all, and if so, whether it matches partially or fully) are compared with one or more sampled, derived, measured or computed values, or ranges thereof, representative of each interval or slice of time preceding the current sample, the collection of which may be referred to as a window as well as, in one implementation, with some or all of the previous values sampled, derived or measured within the current interval.

Figure 4:
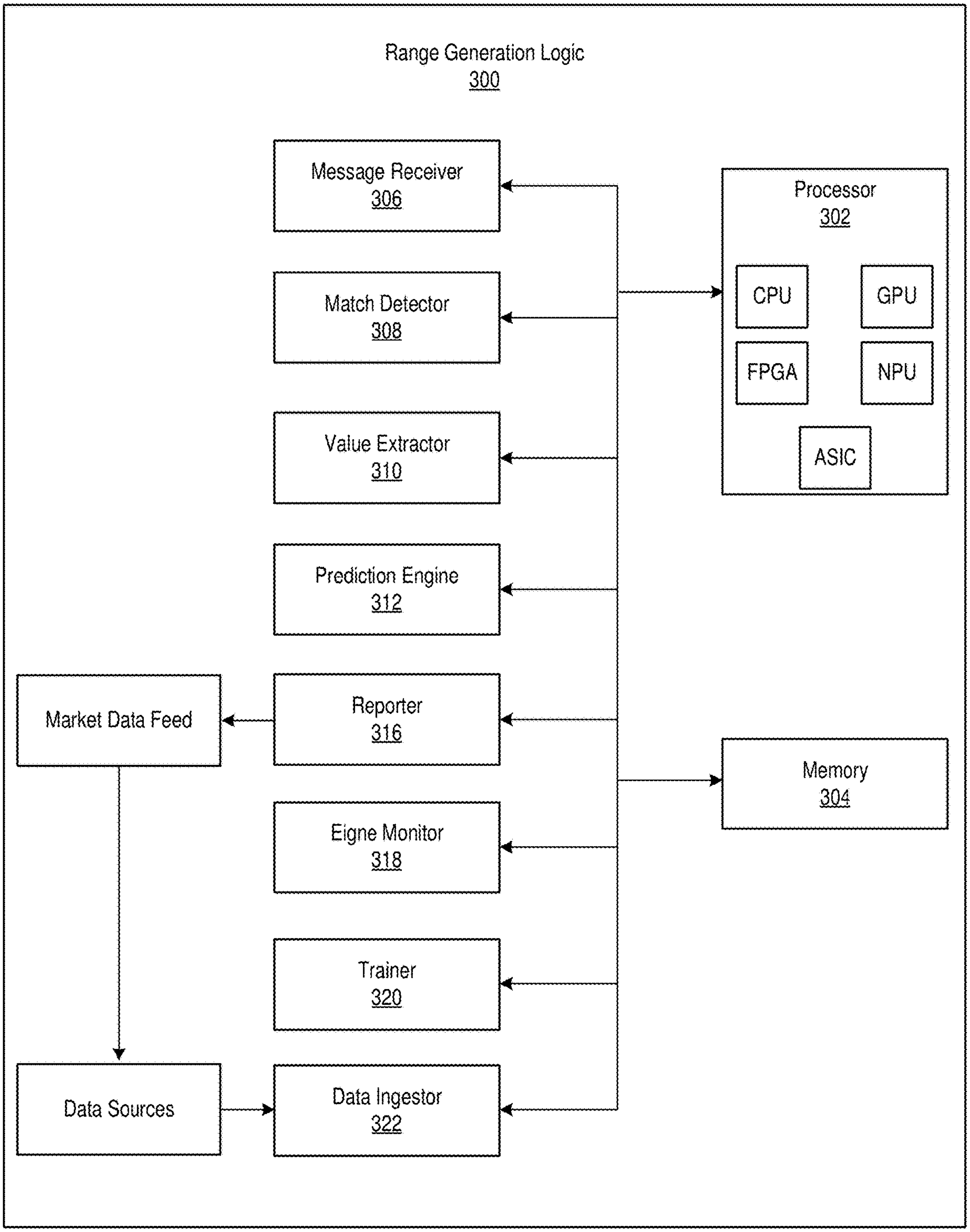
FIG. 4 depicts a block diagram of an example system for providing a value tolerance range for a request for a product.

FIG. 4 depicts a block diagram of a system 300, which may be referred to as "Range Generation Logic," for providing a value tolerance range for a request for a product, such as a financial instrument, which in an exemplary implementation, is implemented as part of the risk management module 134 and/or Match Engine Module 106 of the exchange computer system 100 described above. The financial instrument may be financial derivative products including futures contracts, options on futures contracts, futures contracts that are functions of or related to other futures contracts, swaps, swaptions, or other financial instruments that have their price related to or derived from an underlying product, security, commodity, equity, index, or interest rate product. In one implementation, the orders are for options contracts that belong to a common option class. Orders may also be for baskets, quadrants, other combinations of financial instruments, etc. The option contracts may have a plurality of strike prices and/or comprise put and call contracts. The system 300 may be implemented to execute in accord with ADT technical arrangements, scheduled technical arrangements, and/or various other technical arrangements for the adaptive prediction routine based value tolerance range generation and, in some cases, more particularly self-correcting implementations thereof.

FIG. 4 shows a system 300 for value tolerance range generation for a product in a market, such as for example a product traded on an exchange, such as a financial instrument, e.g. futures contracts, options contracts, etc. The system 300 includes a processor 302 and a memory 304 coupled therewith which may be implemented as a processor 202 and memory 204 as described with respect to FIG. 3.

The system 300 further includes an electronic data transaction request message receiver 306 stored in the memory 304 and executable by the processor 302 to cause the processor 302 to receive and/or analyze electronic data transaction request messages submitted, for example, by users of an exchange computing system implementing a value tolerance range generation system. In one implementation, receiving messages for an object may include identifying, e.g., sampling, the messages to determine a transaction value of the product, e.g. a value during each elapse of a duration of time which will be compared with prior values as described herein, such as bid or ask price of an incoming order ("aggressor") or a trade price thereof if matched to a resting order.

The system 300 further includes a value extractor 310 which may parse the received messages and extract values such as price (and/or other transaction values), quantity (and/or other transaction size data), timing information, data transaction type identifiers (e.g., buy, sell, bid, ask, fill-or-kill, and/or other transaction type identifier). In various implementations, the value extractor 310 operations may be performed via the order extraction module 146, as described with respect to FIG. 2B.

In one implementation, the system 300 is coupled with the order books module 110 described above and monitors the relevant parameters of the order book maintained for the product. It will be appreciated that the system 300 may be (additionally or alternatively) coupled to other modules of the exchange computer system 100 so as to have access to the relevant parameters as described herein and initiate the requisite actions as further described. The disclosed implementations may be implemented separately for each market/order book (including QDM and/or ODM markets) to be monitored, such as a separate process or thread, or may be implemented as a single system for all markets/order books to be monitored thereby.

The system 300 further includes a match detector 308 stored in the memory 304 and executable by the processor 302 to cause the processor 302 to determine whether an electronic data transaction request message will cause or be involved in a match, and if so, whether some but not all (e.g., a partial match), or all (e.g., a full match) of the quantity associated with the electronic data transaction request message is matched. In other words, the match detector determines how much, if any, quantity of an electronic data transaction request message will match and at what value.

In one implementation for use in markets for which outright orders (orders actually placed by a trader) as well as implied orders (orders generated by the Exchange based on outright orders placed in other markets, e.g. spread orders), may be received, only aggressor orders, i.e. outright orders, may be included in the derivation of the state values and further utilized as transaction values. In this implementation, received implied orders may be ignored by the system 300.

In one implementation, the value of the product comprises, for example, a bid price of the product, an ask price of the product, a last traded price of the product, a last traded quantity of the product, a volatility of the product, or other market attribute value, or combination thereof. It will be appreciated that the value of the product may be determined according to other metrics of product value.

Alternatively, or in addition thereto, the action may include modifying the matching/allocation algorithm used to allocate incoming orders to resting orders. For example, if the current matching algorithm is First-In-First-Out ("FIFO"), also referred to as Price-Time, the algorithm may be changed to Pro-Rata. Other algorithms which may be used include Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, Split Price-Time Pro-Rata. See, for example, U.S. Patent Application Publication No. 2014/0006243 entitled "Multiple Trade Matching Algorithms" herein incorporated by reference in its entirety and relied upon.

The system 300 further includes an adaptive prediction engine 312 which may execute an adaptive prediction routine, e.g., to act as value engine 530, 630. The adaptive prediction routine may include one or more machine learning (ML) and/or artificial intelligence (AI) routines trained to generate a value range (such as a price range) for a product, such as a financial instrument, within a particular market. As discussed above, the adaptive prediction engine 312 may operate to generate value tolerance ranges in a variety of markets including QDM and ODM markets and for a variety of products including futures having underliers such as US Treasuries, various other sovereign bonds, cash markets, equities, commodities, energy markets, oil, corn, gas, and/or various other underliers.

In various implementations, AI-based adaptive prediction routines may include deep-learning-based models, transformer models, AI-based time-series predictive models, AI-based image predictive models (e.g. for prediction of images of market activity graphs), denoisers, and/or other AI-based routines. In various implementations ML-based adaptive prediction routines may include classifier models, clustering models, least-squares models, support-vector-machine models, linear mixed models, loss-function-minimization-based models, gradient boosting models, regression and tree based models, and/or other ML models. Various implementations may combine AI and ML models. As an illustrative example implementation AI and ML models may be combined by executing the adaptive prediction routine for generation of the value tolerance range using an ML model, such as a gradient boosting model, while implementing an AI model, such as a deep learning model, to monitor the accuracy of the adaptive prediction routine for determining the need for corrective supervised learning.

The adaptive prediction routine, may for the analyzed product, determine a value tolerance range. The value tolerance range may include a top and bottom price for the range, such that a request for the product, once processed by the value extractor 310 can compare the extracted value to the range and determine whether the value falls within the range. The adaptive prediction routine may output and indication of whether the value falls within the range. The range may further, in some implementations, be defined for volume in addition to value. For example, the range may be wider for smaller volumes, e.g., with the expectation that the larger the volume requested within the message the lower the chance (all other factors equal) that the entire volume (or some other determined portion of the volume of the message) is eventually matched and/or matched within a particular time window. The polarity (e.g., trade side) of the request message may be used an input for determination as to whether the value falls within the range. Different ranges may be determined for different trade polarities. The value tolerance range may be computed at different refresh rates. Thus, the time at which the message is matched/analyzed may also affect whether the message falls within the range.

The range may be converted across different reporting units. For example, the range may be generated in first currency and then converted into a report denominated in a second currency via a currency conversion operation.

The adaptive prediction routine may include multiple operation modes, including a non-operative training mode, e.g., a supervised-learning mode, and an unsupervised operative mode. The adaptive prediction routine, in various implementations, may undergo unsupervised learning in operative modes. Accordingly, the adaptive prediction routine may update with regard to updated data and/or feedback (e.g., eventual match results of range-classified requests) during operation modes in which the adaptive prediction routine produces usable output. Accordingly, unsupervised operative modes are not necessarily non-training modes (but may be non-training modes in some implementations). In the non-operative training mode, the adaptive prediction routine may produce results for which curated (e.g., via selection/sampling by an operator, based on representative sample analysis, historical analysis, and/or other selection scheme) feedback and/or input is used during training. Accordingly, during the non-operative training mode the range indications produced by the adaptive prediction routine may not be representative of real world current conditions and may not necessarily be usable for nominal operation. In some implementations, the adaptive prediction engine 312 may be taking offline for the non-operative training mode operation of the adaptive prediction routine. In some cases, the adaptive prediction routine may be mirrored, e.g., a state copy of the adaptive prediction routine may be created. The cloned adaptive prediction routine may be executed in two (or otherwise multiple instances). Thus, one instance may undergo the non-operative training while the other instance continues in the unsupervised operative mode for uninterrupted operation. A switch over may be performed to the trained instance once the non-operative training is complete. This may allow for training during times of market activity without interruption of service. Nevertheless, some implementations may support after-market-close non-operative training. Accordingly, times of market non-activity may provide opportunities for such non-operative training in some cases.

After the value extractor 310 determines whether the request message falls within the range, the reporter 316 may generate a range indicator for whether the request message falls within the range. The reporter 316 may provide the indicator to the source (e.g., the computer node used by the participant to send the request) and/or a feed for updating the participant. In some cases, the range indicator may further specify the entire range rather than only specifying whether the particular request falls within the range.

The system may include an engine monitor 318 which may monitor an accuracy of the adaptive prediction routine by analyzing matching success/failure of historical requests and determining an accuracy of the generated range(s) by the adaptive prediction routine over a time interval. For example, the adaptive prediction routine may be configured to generate ranges with a particular confidence interval (e.g., an expectation that at least a minimum portion (e.g., by number/volume) of in-range requests are eventually matched, e.g. 75%, 90%, 95%, 99%, and/or other portion). Similarly, a second confidence interval (e.g., 1%, 5, 10%, 25%, and/or other portion) that some maximum portion of out-of-range requests are matched may be enforced. Thus, the engine monitor 318 may monitor whether the accuracy of the ranges produced by the adaptive prediction routine during operation fall out of one or more such confidence intervals. The confidence intervals (or other confidence ratings for the ranges) may be provided along with the range in the form of a performance indicator.

When engine monitor 318 detects that the adaptive prediction routine has fallen out of the accuracy confidence intervals, the engine monitor 318 may assert a training flag for the adaptive prediction routine, such that the adaptive prediction routine will exit the unsupervised operation mode and re-enter the non-operative training mode. The engine monitor 318 may be include in various ADT-arrangement implementation but may be omitted in some scheduled arrangements. In scheduled arrangements re-training of the adaptive prediction routine may not necessarily be triggered using routine accuracy, since re-training occurs at scheduled intervals. Thus, accuracy monitoring may not necessarily be implemented. Nevertheless, accuracy monitoring may be performed in various scheduled-arrangement implementations to, for example, provide accuracy measures for the tolerance ranges and/or indicator provided by the adaptive prediction routine. Accordingly, accuracy analysis may be implemented whether or not it is used as a re-training trigger, at least in some cases.

The trainer 320 may conduct non-operative training (e.g., supervised training) on the adaptive prediction routine, which may include initial training (e.g., pre-deployment) and re-training (e.g., after initial training/deployment). The training may include multi-data set training. For example, the training may rely on a test dataset and a pre-classified dataset showing output ranges for the test dataset. An input dataset may further be used. The adaptive prediction routine may generate output from the input dataset which may be compared to a feedback dataset to train the adaptive prediction routine towards the behavior defined in the feedback dataset. The data sets may be curated, including data that has undergone selection, as described above. The curation may be used to train the adaptive prediction routine toward particular predictive behaviors, e.g., selected by an operator, implicit in the data selection, and/or otherwise present as a result of the curation.

The trainer 320 may respond to the assertions of the training flag by the engine monitor. For example, the trainer may (upon occurrence of a training window) pull the adaptive prediction routine into a non-operative training mode in response to an asserted flag (and/or in response to scheduling, e.g., in blended and/or non-ADT arrangements).

In some implementations, the 320 may further execute pre-training operations such as requisitioning curated data (e.g., by altering an operator to produce/procure such data for upcoming training, generating curated data, and/or otherwise obtaining curated data), accumulation test data, updating historical data to include data after a last training session, executing a state copy of the adaptive prediction routine and/or other pre-training operations. In some cases, the trainer 320 may then open a training window in response to completion of pre-training operations. In some cases, the trainer 320 may nevertheless wait for a next training window after completion of such pre-training operations, e.g., in cases where window scheduling may be controlled by factors other than system readiness for training (e.g., market schedules, and/or other factors).

The data ingestor 322 may receive data from data sources 324 to feed to the predictive engine 312, the engine monitor 318, and/or the trainer 320 to support operation of their respective functions. The data ingestor 322 may pre-process data, e.g., for anonymization, security masking, outlier removal, curation, and/or other data operations. As discussed above, various ingestion architectures may be used, for example, UDAP architectures.

Figure 5:
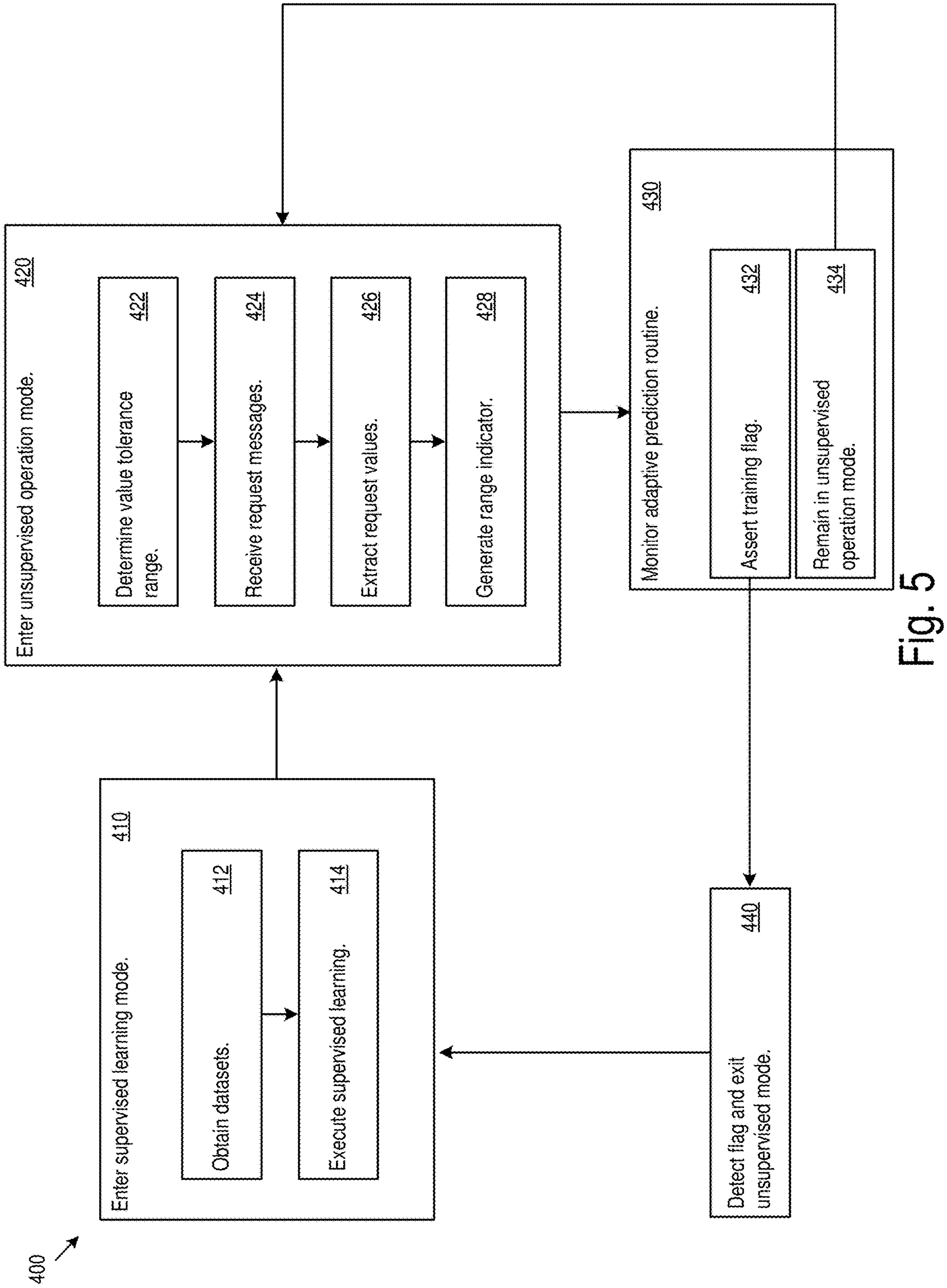
FIG. 5 depicts an example flowchart for operation of a system for providing a value tolerance range for a request for a product in accordance with the disclosed implementations.

FIG. 5 illustrates an example flowchart 400 indicating a method of implementing the disclosed provision of value tolerance ranges for requests for products, such as those described with respect to FIGS. 1 and 2. Implementations may involve all, more or fewer actions indicated by the blocks of FIG. 5. The actions may be performed in the order or sequence shown or in a different sequence. In one implementation, the acts of FIG. 5 may be carried out by risk management module 134, the message handling module 140, and/or match engine module 106, or an impulse detection and mitigation system implemented via risk management module 134, the message handling module 140, and/or match engine module 106.

At block 410, the processor 302 via the trainer 320 causes the adaptive prediction routine to enter a supervised learning mode (or other non-operative training mode) for an instance of training. At block 412, the processor 302, within the supervised learning mode, obtains one or more datasets for supervised learning, which may include test, pre-classified, input, and/or feedback datasets. The datasets may include curated datasets. The processor 302 may execute the supervised learning mode, at block 414, and then enters the mode for unsupervised operation, at block 420.

At block 422, the processor 302 may, via the predictive engine 312, determine a value range for a product (and/or group of related products) based on a current data state of the adaptive prediction routine, e.g., at least based in part on the training done to the adaptive prediction routine in the supervised learning mode. The determination of the value range may further be based unsupervised training, which may use data acquired during operation to further change the data state of the adaptive prediction routine during operation.

At block 424, the processor 302 may receive/monitor an electronic data transaction request messages received via electronic data networks. As discussed herein, the message may be an incoming request message (e.g., including an incoming data transaction request), or may be a conditional message that is triggered. It should be appreciated that that the incoming message will include a transaction value and transaction size information (such as quantity). For example, a message may include an instruction to purchase a specified number of units (i.e., transaction quantity) of a product at a specified value or price (i.e., transaction value).

At block 426, the processor 302 via the value extractor 310 may extract the transaction value and transaction size information and compare the extracted values to the generated value tolerance range. Based on the comparison, the value extractor 310 may, at block 428 generate a range indicator as to whether the request message (e.g., the request contained therein) is within the value tolerance range.

At block 430, the processor 302 via the engine monitor 318 the generated ranges and provide confidence ratings (e.g., in the form of performance indicators for the range indicator) for the accuracy of the value tolerance range and/or the individual indicators. When the confidence ratings fall below a threshold (e.g., a confidence rating tolerance), the processor 302 via the engine monitor 318 may assert a training flag for the adaptive prediction routine, at block 432. While accuracy is maintained, the adaptive prediction routine may remain in the unsupervised operation mode, at block 434.

At block 440, in response to detection of the asserted flag, the processor via the trainer 320, may cause the adaptive prediction routine to exit the unsupervised operation mode and enter the supervised learning mode for another instance of training.

Figure 6:
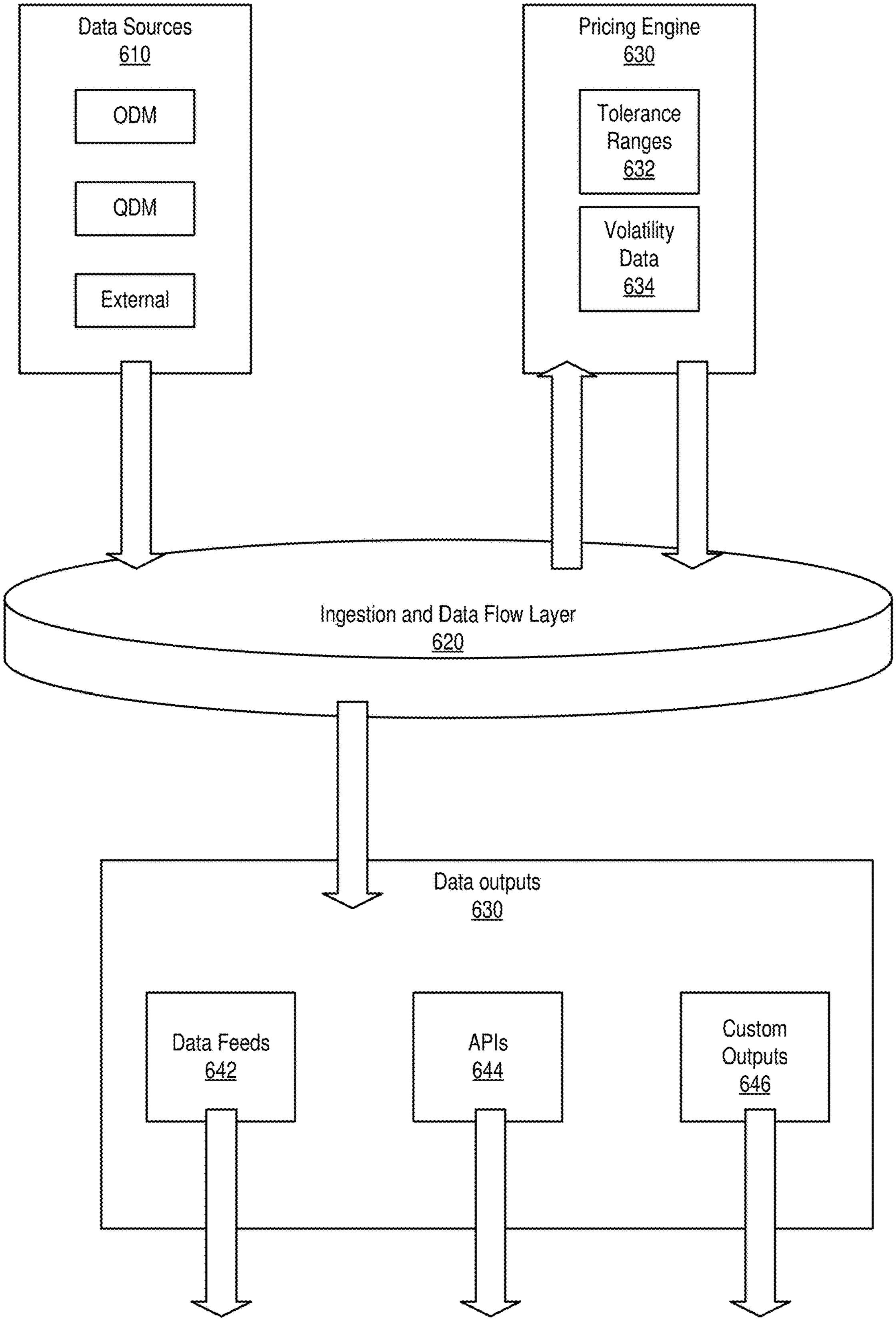
FIG. 6 shows block diagram of an illustrative example ingestor and pricing engine system.

FIG. 6 shows block diagram of an illustrative example ingestor and pricing engine system (IPES) 600. In the example IPES 600, data sources 610 provide data to the IPES via an ingestion and data flow layer 620. The pricing engine 630 generates pricing tolerance ranges 632 and volatility computations 634 based on the incoming data. The generated pricing tolerance ranges 632 and volatility computations 634 may be sent to data output channels 640 (e.g., via the ingestion and data flow layer 520), which may include data feeds 642, application programming interfaces (APIs) 644, and/or custom outputs 646.

In an illustrative operational scenario, the IPES 600 may generate daily two-sided predictions for products, such as bonds and/or treasuries. These daily two-sided predictions may be expanded beyond product in comparatively liquid segments and may include, e.g., bonds that are eligible for various fixed income indices.

In the illustrative operational scenario, market data from various sources may be used, such as, ODM and QDM trading platforms. Market data from external sources, such as news feeds, may be used other data points for processing.

In various implementations, the price tolerance predictions may be published to the participants via APIs and/or trading protocols in an automated system. The prediction are accurate and, in the illustrative operational scenario, real-time.

In the illustrative operational scenario, the pricing engine 630 may use an entire stack of inquiry responses sent by liquidity providers, regardless of whether the bond traded or not. The cover level on trades and levels back on inquiries that do not trade are high-quality pieces of information which will be based on trading, market data and quotes. Together with data on successful trades, data on unmatched requests leads to more accurate pricing. In the illustrative operational scenario, the pricing engine may use information form CLOB-based markets and private markets.

In the illustrative operational scenario, the pricing engine 630 may use Benchmark, US Investment Grade (IG) and High Yield (HY) bonds. The pricing engine 630 may access daily pricing on bonds in a first phase, to provide high quality transactional inputs.

In the illustrative operational scenario, the pricing engine 630 extends the analysis of the first phase to source public sources, e.g., European, sovereign, Asian transaction and supranational bonds, for an extended trading data set. Thus, the IPES creates a centralized source of real-time fixed income trade data across fixed-income asset classes including Futures, Spots trades per day. The IPES 600 captures both exchange and over the counter (OTC) activity in primary and secondary markets, irrespective of trading venue.

In the illustrative operational scenario, combined public market data and private trading platform data may be used to create robust data points. For example, trades completed on platform may serve as one useful data point. In the illustrative operational scenario, the pricing engine 630 uses anonymized spread data from various sources including after-open and pre-open data sources. These data may be beneficial for the mitigation of risk, the execution of trading strategies, and arbitrage.

In various implementations, the output of the pricing engine 630 may be data set. The data set may include fields such as: market segment, data source, sample size, various spread measures, computed volatility data, and tolerance data (e.g., which may be computed as deviational values, e.g., with a "trade day" bid-offer spread and/or other time-of-transaction spread as a baseline) for various confidence ratings, e.g., median, $75^{th}$ percentile, $99^{th}$ percentile.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Additionally, the illustrations are merely representational and may not e drawn to scale. Certain proportions within the illustrations may be exaggerated, while other proportions may be minimized. Accordingly, the disclosure and the figures are to be regarded as illustrative rather than restrictive.

Table 1 includes various examples.

TABLE 1

| Examples |
|---|
| 1. A computer-implemented method for determining a value tolerance range for a product traded via an electronic trading system, the computer-implemented method including:<br>obtaining, by a processor of the electronic trading system, a supervised-learning dataset including at least a first input dataset and a first feedback dataset;<br>executing, by the processor, a first instance of supervised learning on an adaptive prediction routine in a supervised-learning mode using the supervised-learning dataset by providing the first input dataset as input and providing at least curated portions of the first feedback dataset as response feedback to the adaptive prediction routine;<br>exiting, by the processor, the supervised-learning mode for the adaptive prediction routine and entering an unsupervised-operation mode;<br>receiving, via an electronic data network coupled to the electronic trading system and within an interval occurring after entering the unsupervised-operation mode, one or more electronic data request messages, the request messages each including a corresponding request to execute a transaction for the product at a corresponding value and corresponding volume;<br>determining, by the processor using the adaptive prediction routine and based on a current data state of the adaptive prediction routine, the value tolerance range, the current data state |

TABLE 1-continued

| Examples |
| --- |
| produced at least in part based on the supervised learning in the supervised-learning mode;<br>generating, by the processor and for each the one or more corresponding values of the one or more electronic data request messages a corresponding range indicator and a corresponding performance indicator for the corresponding range indicator, the corresponding range indicator indicating whether the respective corresponding value falls in or out of the value tolerance range, the corresponding performance indicator including:<br>when the corresponding range indicator indicates that the respective corresponding value falls within the range, an in-range confidence rating; and<br>when the corresponding range indicator indicates that the respective corresponding value falls outside the range, an out-of-range confidence rating;<br>when the in-range confidence rating and/or the out-of-range confidence rating fall below a rating tolerance, flagging the adaptive prediction routine for a second instance of supervised learning on the adaptive prediction routine; and<br>exiting, by the processor and in response to the flagging, the unsupervised-operation mode for the adaptive prediction routine and entering the supervised-learning mode.<br>2. The computer implemented method of example 1 or any other example in this table, wherein:<br>the in-range confidence rating includes a first confidence level that at least first predetermined portion of a volume of the requests determined to be within the value tolerance range will execute; and<br>the in-range confidence rating includes a second confidence level that at least a second predetermined portion of a volume of requests determined to be outside of the value tolerance range will not execute.<br>3. The computer implemented method of example 2 or any other example in this table, wherein the rating tolerance for the first and second predetermined portions include 95% portions.<br>4. The computer implemented method of example 1 or any other example in this table, wherein generating the corresponding confidence range indicator for the respective corresponding value includes:<br>analyzing historical data over the interval to determine a first actual executed volume of requests found to be within the value tolerance range; and/or<br>analyzing the historical data over the interval to determine a second actual executed volume of requests found to be outside of the value tolerance range.<br>5. The computer implemented method of example 1 or any other example in this table, wherein generating the corresponding confidence range indicator for the respective corresponding value includes:<br>analyzing model data updated during the interval to determine a first predicted executed volume of requests found to be within the value tolerance range; and/or<br>analyzing the model data update during the interval to determine a second predicted executed volume of requests found to be outside of the value tolerance range.<br>6. The computer implemented method of example 1 or any other example in this table, wherein the one or more electronic data request messages include one or more quote-driven-market (QDM) venue request messages.<br>7. The computer implemented method of example 1 or any other example in this table, wherein the one or more electronic data request messages include one or more order-driven-market (ODM) venue request messages.<br>8. The computer implemented method of example 1 or any other example in this table, wherein obtaining the supervised-learning dataset includes obtaining the supervised-learning dataset via a universal-data-access-protocol (UDAP)-compliant data ingestion layer.<br>9. The computer implemented method of example 1 or any other example in this table, wherein obtaining the supervised-learning dataset includes obtaining data on bond prices over a defined historical period.<br>10. The computer implemented method of example 1 or any other example in this table, wherein determining the value tolerance range includes determining the value tolerance range in units of first currency and then converting the value tolerance range into units of a second currency via an exchange rate.<br>11. The computer implemented method of example 1 or any other example in this table, wherein the corresponding range indicator further includes an express identification of the determined value tolerance range for the corresponding value.<br>12. Non-transitory machine-readable media configured to store instructions thereon, the instructions configured to, when executed, cause a processor to:<br>obtain a supervised-learning dataset including at least a first input dataset and a first feedback dataset;<br>execute a first instance of supervised learning on an adaptive prediction routine in a supervised-learning mode using the supervised-learning dataset by providing the first input dataset as input and providing at least curated portions of the first feedback dataset as response feedback to the adaptive prediction routine;<br>exit the supervised-learning mode for the adaptive prediction routine and entering an unsupervised-operation mode;<br>receive, via an electronic data network coupled to an electronic trading system and within an interval occurring after entering the unsupervised-operation mode, one or more electronic data request messages, the request messages each including a corresponding request to execute a transaction for a product at a corresponding value and corresponding volume;<br>determine, using the adaptive prediction routine and based on a current data state of the adaptive prediction routine, a value tolerance range, the current data state produced at least in part based on the supervised learning in the supervised-learning mode;<br>generate, for each the one or more corresponding values of the one or more electronic data request messages a corresponding range indicator and a corresponding performance |

TABLE 1-continued

| Examples |
| --- |
| indicator for the corresponding range indicator, the corresponding range indicator indicating whether the respective corresponding value falls in or out of the value tolerance range, the corresponding performance indicator including: |
| when the corresponding range indicator indicates that the respective corresponding value falls within the range, an in-range confidence rating; and |
| when the corresponding range indicator indicates that the respective corresponding value falls outside the range, an out-of-range confidence rating; |
| flag, when the in-range confidence rating and/or the out-of-range confidence rating fall below a rating tolerance, the adaptive prediction routine for a second instance of supervised learning on the adaptive prediction routine; and |
| exit, in response to the flagging, the unsupervised-operation mode for the adaptive prediction routine and enter the supervised-learning mode. |
| 13. The non-transitory machine-readable media of example 12 or any other example in this table, wherein: |
| the in-range confidence rating includes a first confidence level that at least first predetermined portion of a volume of requests determined to be within the value tolerance range will execute; and |
| the in-range confidence rating includes a second confidence level that at least a second predetermined portion of a volume of requests determined to be outside of the value tolerance range will not execute. |
| 14. The non-transitory machine-readable media of example 13 or any other example in this table, wherein the rating tolerance for the first and second predetermined portions include 95% portions. |
| 15. The non-transitory machine-readable media of example 12 or any other example in this table, wherein the instructions are further configured to cause the processor to generate the corresponding confidence range indicator for the respective corresponding value by: |
| analyzing historical data over the interval to determine a first actual executed volume of requests found to be within the value tolerance range; and/or |
| analyzing the historical data over the interval to determine a second actual executed volume of requests found to be outside of the value tolerance range. |
| 16. The non-transitory machine-readable media of example 12 or any other example in this table, wherein the instructions are further configured to cause the processor to generate the corresponding confidence range indicator for the respective corresponding value includes: |
| analyzing model data updated during the interval to determine a first predicted executed volume of requests found to be within the value tolerance range; and/or |
| analyzing the model data update during the interval to determine a second predicted executed volume of requests found to be outside of the value tolerance range. |
| 17. The non-transitory machine-readable media of example 12 or any other example in this table, wherein the one or more electronic data request messages include one or more quote-driven-market (QDM) venue request messages. |
| 18. The non-transitory machine-readable media of example 12 or any other example in this table, wherein the one or more electronic data request messages include one or more order-driven-market (ODM) venue request messages. |
| 19. The non-transitory machine-readable media of example 12 or any other example in this table, wherein the corresponding range indicator further includes an express identification of the determined value tolerance range for the corresponding value. |
| 20. An electronic trading system for determining a value tolerance range for a product, the electronic trading system including: |
| means for obtaining a supervised-learning dataset including at least a first input dataset and a first feedback dataset; |
| means for executing a first instance of supervised learning on an adaptive prediction routine in a supervised-learning mode using the supervised-learning dataset by providing the first input dataset as input and providing at least curated portions of the first feedback dataset as response feedback to the adaptive prediction routine; |
| means for exiting the supervised-learning mode for the adaptive prediction routine and entering an unsupervised-operation mode; |
| means for receiving, via an electronic data network coupled to the electronic trading system and within an interval occurring after entering the unsupervised-operation mode, one or more electronic data request messages, the request messages each including a corresponding request to execute a transaction for the product at a corresponding value and corresponding volume; |
| means for determining, using the adaptive prediction routine and based on a current data state of the adaptive prediction routine, the value tolerance range, the current data state produced at least in part based on the supervised learning in the supervised-learning mode; |
| means for generating, for each the one or more corresponding values of the one or more electronic data request messages a corresponding range indicator and a corresponding performance indicator for the corresponding range indicator, the corresponding range indicator indicating whether the respective corresponding value falls in or out of the value tolerance range, the corresponding performance indicator including: |
| when the corresponding range indicator indicates that the respective corresponding value falls within the range, an in-range confidence rating; and |
| when the corresponding range indicator indicates that the respective corresponding value falls outside the range, an out-of-range confidence rating; |
| means for flagging, when the in-range confidence rating and/or the out-of-range confidence rating fall below a rating tolerance, the adaptive prediction routine for a second instance of supervised learning on the adaptive prediction routine; and |
| means for exiting, in response to the flagging, the unsupervised-operation mode for the adaptive prediction routine and entering the supervised-learning mode. |

TABLE 1-continued

| Examples |
|---|
| 21. A computer-implemented method for determining a value tolerance range for a product traded via an electronic trading system, the computer-implemented method including: receiving, via an electronic data network coupled to the electronic trading system, one or more electronic data request messages, the request messages each including a corresponding request to execute a transaction for the product at a corresponding value and corresponding volume; determining, by the processor using an adaptive prediction routine and based on a current data state of the adaptive prediction routine, a value tolerance range; generating, by the processor and for each the one or more corresponding values of the one or more electronic data request messages a corresponding range indicator, the corresponding range indicator indicating whether the respective corresponding value falls in or out of the value tolerance range; executing, when at least one of the one or more range indicators for the one or more electronic data request messages indicates that at least one of the one or more electronic data request messages falls outside the value tolerance range, a response action. |
| 22. The method of example 21 or any other example in this table, wherein the response action includes: determining that the at least one of the one or more electronic data request messages that falls outside the value tolerance range causes a portion of out-of-tolerance request messages sent by the sender of the request messages to exceed a pre-defined threshold of allowed out-of-tolerance messages, wherein: optionally, the pre-defined threshold is specified by the sender via an application interface for the electronic trading system. |
| 23. The method of example 22 or any other example in this table, wherein the response action includes: cancelling the at least one of the one or more electronic data request messages that falls outside the value tolerance range in response to determining that the pre-defined threshold of allowed out-of-tolerance messages was exceeded; and/or sending, to the application interface, a response message that identifies a time-of-start for a pattern that caused the pre-defined threshold of allowed out-of-tolerance messages to be exceeded. |

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for determining a value tolerance range for a product traded via an electronic trading system, the computer-implemented method including:

obtaining, by a processor of the electronic trading system, a supervised-learning dataset including at least a first input dataset and a first feedback dataset;

executing, by the processor, a first instance of supervised learning on an adaptive prediction routine in a supervised-learning mode using the supervised-learning dataset by providing the first input dataset as input and providing at least curated portions of the first feedback dataset as response feedback to the adaptive prediction routine;

exiting, by the processor, the supervised-learning mode for the adaptive prediction routine and entering an unsupervised-operation mode;

receiving, via an electronic data network coupled to the electronic trading system and within an interval occurring after entering the unsupervised-operation mode, one or more electronic data request messages, the request messages each including a corresponding request to execute a transaction for the product at a corresponding value and corresponding volume;

determining, by the processor using the adaptive prediction routine and based on a current data state of the adaptive prediction routine, the value tolerance range, the current data state produced at least in part based on the supervised learning in the supervised-learning mode;

generating, by the processor and for each the one or more corresponding values of the one or more electronic data request messages a corresponding range indicator and a corresponding performance indicator for the corresponding range indicator, the corresponding range indicator indicating whether the respective corresponding value falls in or out of the value tolerance range, the corresponding performance indicator including:

when the corresponding range indicator indicates that the respective corresponding value falls within the range, an in-range confidence rating; and when the corresponding range indicator indicates that the respective corresponding value falls outside the range, an out-of-range confidence rating;

when the in-range confidence rating and/or the out-of-range confidence rating fall below a rating tolerance, flagging the adaptive prediction routine for a second instance of supervised learning on the adaptive prediction routine; and exiting, by the processor and in response to the flagging, the unsupervised-operation mode for the adaptive prediction routine and entering the supervised-learning mode.

2. The computer-implemented method of claim 1, wherein:

the in-range confidence rating includes a first confidence level that at least a first predetermined portion of a volume of the requests determined to be within the value tolerance range will execute; and the out-of-range confidence rating includes a second confidence level that at least a second predetermined portion of a volume of requests determined to be outside of the value tolerance range will not execute.

3. The computer-implemented method of claim 2, wherein the first and second predetermined portions include 95% portions.

4. The computer-implemented method of claim 1, wherein generating the corresponding confidence range indicator for the respective corresponding value includes:

analyzing historical data over the interval to determine a first actual executed volume of requests found to be within the value tolerance range; and/or analyzing the historical data over the interval to determine a second actual executed volume of requests found to be outside of the value tolerance range.

5. The computer-implemented method of claim 1, wherein generating the corresponding confidence range indicator for the respective corresponding value includes:

analyzing model data updated during the interval to determine a first predicted executed volume of requests found to be within the value tolerance range; and/or analyzing the model data updated during the interval to determine a second predicted executed volume of requests found to be outside of the value tolerance range.

6. The computer-implemented method of claim 1, wherein the one or more electronic data request messages include one or more quote-driven-market (QDM) venue request messages.

7. The computer-implemented method of claim 1, wherein the one or more electronic data request messages include one or more order-driven-market (ODM) venue request messages.

8. The computer-implemented method of claim 1, wherein obtaining the supervised-learning dataset includes obtaining the supervised-learning dataset via a universal-data-access-protocol (UDAP)-compliant data ingestion layer.

9. The computer-implemented method of claim 1, wherein obtaining the supervised-learning dataset includes obtaining data on bond prices over a defined historical period.

10. The computer-implemented method of claim 1, wherein determining the value tolerance range includes determining the value tolerance range in units of first currency and then converting the value tolerance range into units of a second currency via an exchange rate.

11. The computer-implemented method of claim 1, wherein the corresponding range indicator further includes an express identification of the determined value tolerance range for the corresponding value.

12. Non-transitory machine-readable media configured to store instructions thereon, the instructions configured to, when executed, cause a processor to:

obtain a supervised-learning dataset including at least a first input dataset and a first feedback dataset;

execute a first instance of supervised learning on an adaptive prediction routine in a supervised-learning mode using the supervised-learning dataset by providing the first input dataset as input and providing at least curated portions of the first feedback dataset as response feedback to the adaptive prediction routine;

exit the supervised-learning mode for the adaptive prediction routine and entering an unsupervised-operation mode;

receive, via an electronic data network coupled to an electronic trading system and within an interval occurring after entering the unsupervised-operation mode, one or more electronic data request messages, the request messages each including a corresponding request to execute a transaction for a product at a corresponding value and corresponding volume;

determine, using the adaptive prediction routine and based on a current data state of the adaptive prediction routine, a value tolerance range, the current data state produced at least in part based on the supervised learning in the supervised-learning mode;

generate, for each the one or more corresponding values of the one or more electronic data request messages a corresponding range indicator and a corresponding performance indicator for the corresponding range indicator, the corresponding range indicator indicating whether the respective corresponding value falls in or out of the value tolerance range, the corresponding performance indicator including:

when the corresponding range indicator indicates that the respective corresponding value falls within the range, an in-range confidence rating; and when the corresponding range indicator indicates that the respective corresponding value falls outside the range, an out-of-range confidence rating;

flag, when the in-range confidence rating and/or the out-of-range confidence rating fall below a rating tolerance, the adaptive prediction routine for a second instance of supervised learning on the adaptive prediction routine; and exit, in response to the flagging, the unsupervised-operation mode for the adaptive prediction routine and enter the supervised-learning mode.

13. The non-transitory machine-readable media of claim 12, wherein:

the in-range confidence rating includes a first confidence level that at least a first predetermined portion of a volume of requests determined to be within the value tolerance range will execute; and the out-of-range confidence rating includes a second confidence level that at least a second predetermined portion of a volume of requests determined to be outside of the value tolerance range will not execute.

14. The non-transitory machine-readable media of claim 13, wherein the first and second predetermined portions include 95% portions.

15. The non-transitory machine-readable media of claim 12, wherein the instructions are further configured to cause the processor to generate the corresponding confidence range indicator for the respective corresponding value by:

analyzing historical data over the interval to determine a first actual executed volume of requests found to be within the value tolerance range; and/or analyzing the historical data over the interval to determine a second actual executed volume of requests found to be outside of the value tolerance range.

16. The non-transitory machine-readable media of claim 12, wherein the instructions are further configured to cause the processor to generate the corresponding confidence range indicator for the respective corresponding value includes:

analyzing model data updated during the interval to determine a first predicted executed volume of requests found to be within the value tolerance range; and/or analyzing the model data updated during the interval to determine a second predicted executed volume of requests found to be outside of the value tolerance range.

17. The non-transitory machine-readable media of claim 12, wherein the one or more electronic data request messages include one or more quote-driven-market (QDM) venue request messages.

18. The non-transitory machine-readable media of claim 12, wherein the one or more electronic data request messages include one or more order-driven-market (ODM) venue request messages.

19. The non-transitory machine-readable media of claim 12, wherein the corresponding range indicator further includes an express identification of the determined value tolerance range for the corresponding value.

20. An electronic trading system for determining a value tolerance range for a product, the electronic trading system including:

means for obtaining a supervised-learning dataset including at least a first input dataset and a first feedback dataset;

means for executing a first instance of supervised learning on an adaptive prediction routine in a supervised-learning mode using the supervised-learning dataset by providing the first input dataset as input and providing at least curated portions of the first feedback dataset as response feedback to the adaptive prediction routine;

means for exiting the supervised-learning mode for the adaptive prediction routine and entering an unsupervised-operation mode;

means for receiving, via an electronic data network coupled to the electronic trading system and within an interval occurring after entering the unsupervised-operation mode, one or more electronic data request messages, the request messages each including a corresponding request to execute a transaction for the product at a corresponding value and corresponding volume;

means for determining, using the adaptive prediction routine and based on a current data state of the adaptive prediction routine, the value tolerance range, the current data state produced at least in part based on the supervised learning in the supervised-learning mode;

means for generating, for each the one or more corresponding values of the one or more electronic data request messages a corresponding range indicator and a corresponding performance indicator for the corresponding range indicator, the corresponding range indicator indicating whether the respective corresponding value falls in or out of the value tolerance range, the corresponding performance indicator including:

when the corresponding range indicator indicates that the respective corresponding value falls within the range, an in-range confidence rating; and when the corresponding range indicator indicates that the respective corresponding value falls outside the range, an out-of-range confidence rating;

means for flagging, when the in-range confidence rating and/or the out-of-range confidence rating fall below a rating tolerance, the adaptive prediction routine for a second instance of supervised learning on the adaptive prediction routine; and means for exiting, in response to the flagging, the unsupervised-operation mode for the adaptive prediction routine and entering the supervised-learning mode.

* * * * *